(12) United States Patent
Stratton et al.

(10) Patent No.: US 12,723,555 B2
(45) Date of Patent: Sep. 1, 2026

(54) AIRCRAFT POWERPLANT EXHAUST SECTION WITH FLOW DIVERTER

(71) Applicant: Pratt & Whitney Canada Corp., Longueuil (CA)

(72) Inventors: Russell Stratton, Toronto (CA); Paul Weaver, Chateauguay (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/899,904

(22) Filed: Sep. 27, 2024

(65) Prior Publication Data

US 2026/0092578 A1 Apr. 2, 2026

(51) Int. Cl.

| | |
|---|---|
| ***F02K 1/44*** | (2006.01) |
| ***B64D 33/04*** | (2006.01) |
| ***F02K 1/00*** | (2006.01) |
| ***F02K 1/06*** | (2006.01) |
| *F02K 1/10* | (2006.01) |

(52) U.S. Cl.

CPC ................ *F02K 1/44* (2013.01); *B64D 33/04* (2013.01); *B64D 33/06* (2013.01); *F02K 1/002* (2013.01); *F02K 1/06* (2013.01); *F02K 1/10* (2013.01)

(58) Field of Classification Search

CPC .. B64D 33/04; B64D 33/06; B64D 2033/045; F02K 1/00; F02K 1/002; F02K 1/10; F02K 1/78; F02K 1/82; F02K 1/44; F01K 1/06

See application file for complete search history.

(56) References Cited

U.S. PATENT DOCUMENTS

| | | | | | |
|---|---|---|---|---|---|
| 2,774,554 | A * | 12/1956 | Ashwood | B64C 29/0066 | 239/265.29 |
| 2,947,499 | A * | 8/1960 | Douglas | F02K 1/002 | 239/265.29 |
| 2,947,501 | A * | 8/1960 | Flint | B64C 29/0066 | 239/265.29 |
| 3,269,663 | A | 8/1966 | Strobl | | |

(Continued)

FOREIGN PATENT DOCUMENTS

| | | | | |
|---|---|---|---|---|
| DE | 102009048201 A1 | 4/2011 | | |
| GB | 1034067 A * | 6/1966 | | F02K 1/002 |

OTHER PUBLICATIONS

EP Search Report for EP Patent Application No. 25205123.0 dated Mar. 5, 2026.

*Primary Examiner* — Thomas P Burke
(74) *Attorney, Agent, or Firm* — Getz Balich LLC

(57) ABSTRACT

An aircraft powerplant includes a core of a gas turbine engine and an exhaust section. The core includes a core flowpath, a compressor section, a combustor section and a turbine section. The core flowpath extends longitudinally through the compressor section, the combustor section and the turbine section. The exhaust section includes an exhaust flowpath and a flow diverter. The flow diverter includes a diverter panel configured to pivot between a first position and a second position. The flow diverter is configured to fluidly couple the diffuser section to the first nozzle section and fluidly decouple the diffuser section from the second nozzle section when the diverter panel is in the first position. The flow diverter is configured to fluidly couple the diffuser section to the second nozzle section and fluidly decouple the diffuser section from the first nozzle section when the diverter panel is in the second position.

19 Claims, 15 Drawing Sheets

(56) References Cited

U.S. PATENT DOCUMENTS

| | | | | |
|---|---|---|---|---|
| 3,640,468 | A | 2/1972 | Searle | |
| 3,792,587 | A * | 2/1974 | Kappus | B64C 29/0066 244/23 B |
| 3,997,134 | A * | 12/1976 | Drakeley | B64D 27/20 239/265.29 |
| 4,222,234 | A | 9/1980 | Adamson | |
| 4,291,782 | A | 9/1981 | Klees | |
| 4,739,932 | A * | 4/1988 | Szuminski | F02K 1/006 239/265.33 |
| 9,500,128 | B2 | 11/2016 | Rainer | |
| 10,407,177 | B2 | 9/2019 | Lamb, Jr. | |
| 11,952,134 | B2 | 4/2024 | Carretero Benignos | |
| 2002/0100837 | A1 * | 8/2002 | Hatrick | B64D 33/04 244/110 B |
| 2005/0252193 | A1 * | 11/2005 | Iya | F02K 1/822 60/266 |
| 2014/0284395 | A1 * | 9/2014 | Pilon | F02K 1/46 239/11 |
| 2017/0121033 | A1 * | 5/2017 | Lamb, Jr. | B64C 27/04 |
| 2023/0228230 | A1 * | 7/2023 | Alstad | F02K 1/72 60/226.2 |
| 2025/0334085 | A1 * | 10/2025 | Stratton | F02K 1/00 |

* cited by examiner 70
66
176
174
172
174
162
120

70
66
176
174
172
174
162
120

AIRCRAFT POWERPLANT EXHAUST SECTION WITH FLOW DIVERTER

TECHNICAL FIELD

This disclosure relates generally to an aircraft and, more particularly, to an exhaust section for a powerplant of the aircraft.

BACKGROUND INFORMATION

Various systems and methods are known in the art for controlling aircraft propulsion system exhaust emissions. While these known systems and methods have various benefits, there is still room in the art for improvement.

SUMMARY

According to an aspect of the present disclosure, a powerplant is provided for an aircraft. This powerplant includes a core of a gas turbine engine and an exhaust section. The core includes a core flowpath, a compressor section, a combustor section and a turbine section. The core flowpath extends longitudinally through the compressor section, the combustor section and the turbine section. The exhaust section includes an exhaust flowpath and a flow diverter. The exhaust flowpath is fluidly coupled to and downstream of the core flowpath. The exhaust flowpath includes a diffuser section, a first nozzle section and a second nozzle section. A cross-sectional flow area of the diffuser section increases in size as the diffuser section extends longitudinally away from the core flowpath. A cross-sectional flow area of the first nozzle section decreases in size as the first nozzle section extends longitudinally towards a first nozzle outlet from the exhaust section. A cross-sectional flow area of the second nozzle section decreases in size as the second nozzle section extends longitudinally towards a second nozzle outlet from the exhaust section. The flow diverter includes a diverter panel configured to pivot about a pivot axis between a first position and a second position. The flow diverter is configured to fluidly couple the diffuser section to the first nozzle section and fluidly decouple the diffuser section from the second nozzle section when the diverter panel is in the first position. The flow diverter is configured to fluidly couple the diffuser section to the second nozzle section and fluidly decouple the diffuser section from the first nozzle section when the diverter panel is in the second position.

According to another aspect of the present disclosure, another powerplant is provided for an aircraft. This powerplant includes a core of a gas turbine engine and an exhaust section. The core includes a core flowpath, a compressor section, a combustor section and a turbine section. The core flowpath extends longitudinally through the compressor section, the combustor section and the turbine section. The exhaust section includes an exhaust flowpath, a flow diverter and an exhaust treatment device. The exhaust flowpath is fluidly coupled to and downstream of the core flowpath. The exhaust flowpath includes an upstream section, a first nozzle section and a second nozzle section. The upstream section extends longitudinally from the core flowpath to the flow diverter. The first nozzle section extends longitudinally from the flow diverter to a first nozzle outlet from the exhaust section. The second nozzle section extends longitudinally from the flow diverter to a second nozzle outlet from the exhaust section. The flow diverter includes a diverter panel configured to pivot about a pivot axis between a first position and a second position. The flow diverter is configured to fluidly couple the upstream section to the first nozzle section and fluidly decouple the upstream section from the second nozzle section when the diverter panel is in the first position. The flow diverter is configured to fluidly couple the upstream section to the second nozzle section and fluidly decouple the upstream section from the first nozzle section when the diverter panel is in the second position. The exhaust treatment device is arranged with and extends across the first nozzle section.

According to still another aspect of the present disclosure, another powerplant is provided for an aircraft. This powerplant includes a core of a gas turbine engine and an exhaust section. The core includes a core flowpath, a compressor section, a combustor section and a turbine section. The core flowpath extends longitudinally through the compressor section, the combustor section and the turbine section. The exhaust section includes an exhaust flowpath and a flow diverter. The exhaust flowpath includes an upstream section, a first nozzle section and a second nozzle section. The upstream section is fluidly coupled to and downstream of the core flowpath. The first nozzle section is configured to direct combustion products, received from the upstream section through the flow diverter, along a first longitudinal trajectory out of the powerplant through a first nozzle outlet. The second nozzle section is configured to direct the combustion products, received from the upstream section through the flow diverter, along a second longitudinal trajectory out of the powerplant through a second nozzle outlet. The second longitudinal trajectory is angularly offset form the first longitudinal trajectory by an offset angle equal to or less than ten degrees. The flow diverter includes a diverter panel configured to pivot about a pivot axis between a first position and a second position. The flow diverter is configured to fluidly couple the upstream section to the first nozzle section and fluidly decouple the upstream section from the second nozzle section when the diverter panel is in the first position. The flow diverter is configured to fluidly couple the upstream section to the second nozzle section and fluidly decouple the upstream section from the first nozzle section when the diverter panel is in the second position.

The gas turbine engine may include an exhaust cone that projects longitudinally into the diffuser section. The diffuser section may extend longitudinally along and circumscribe the exhaust cone.

The first nozzle section may be configured to direct combustion products, received from the diffuser section through the flow diverter, along a first longitudinal trajectory out of the powerplant through the first nozzle outlet. The second nozzle section may be configured to direct the combustion products, received from the diffuser section through the flow diverter, along a second longitudinal trajectory out of the powerplant through the second nozzle outlet. The second longitudinal trajectory may be angularly offset form the first longitudinal trajectory by an acute offset angle.

The acute offset angle may be equal to or less than forty-five degrees.

The first nozzle section may be configured to direct combustion products, received from the diffuser section through the flow diverter, along a first longitudinal trajectory out of the powerplant through the first nozzle outlet. The first longitudinal trajectory may be parallel to a horizon line or is angularly offset from the horizon line and point vertically downward relative to a direction of gravity. The second nozzle section may be configured to direct the combustion products, received from the diffuser section through the flow diverter, along a second longitudinal trajectory out of the powerplant through the second nozzle outlet. The second longitudinal trajectory may be parallel to the horizon line or may be angularly offset from the horizon line and points vertically downward relative to the direction of gravity.

The cross-sectional flow area of the first nozzle section at the first nozzle outlet may be within five percent of the cross-sectional flow area of the second nozzle section at the second nozzle outlet.

The diverter panel may be configured to block flow from the diffuser section into the second exhaust section when the diverter panel is in the first position. The diverter panel may be configured to block flow from the diffuser section into the first exhaust section when the diverter panel is in the second position.

The exhaust flowpath may also include: a first diverter section extending longitudinally through the flow diverter from the diffuser section to the first nozzle section when the diverter panel is in the first position, a cross-sectional flow area the first diverter section increasing in size as the first diverter section extends longitudinally along a first side of the diverter panel towards the first nozzle section; and a second diverter section extending longitudinally through the flow diverter from the diffuser section to the second nozzle section when the diverter panel is in the second position, a cross-sectional flow area the second diverter section decreasing in size as the second diverter section extends longitudinally along a second side of the diverter panel towards the second nozzle section.

The diverter panel may be pivotally coupled to a stationary structure of the exhaust section at a downstream trailing edge of the diverter panel.

The flow diverter may include a linear actuator arranged vertically above the diverter panel relative to a direction of gravity. The linear actuator may be configured to push against the diverter panel to pivot the diverter panel vertically downwards from the first position to the second position. The linear actuator may be configured to pull against the diverter panel to pivot the diverter panel vertically upwards from the second position to the first position.

The flow diverter may also include a first lock and/or a second lock. The first lock may be configured to lock the diverter panel in the first position. The second lock may be configured to lock the diverter panel in the second position.

The flow diverter may also include a first sensor and/or a second sensor. The first sensor may be configured to determine whether the first lock is locked and/or unlocked. The second sensor may be configured to determine whether the second lock is locked and/or unlocked.

The flow diverter further may also include a first sensor and/or a second sensor. The first sensor may be configured to determine whether the diverter panel is in the first position. The second sensor may be configured to determine whether the diverter panel is in the second position.

The flow diverter may also include a sidewall and at least one of: a first seal mounted to the sidewall, the first seal sealing a gap between the diverter panel and the sidewall when the diverter panel is in the first position; or a second seal mounted to the sidewall, the second seal sealing a gap between the diverter panel and the sidewall when the diverter panel is in the second position.

The diverter panel may extend along a straight centerline of the diverter panel from a leading edge of the diverter panel to a trailing edge of the diverter panel.

The diverter panel may extend along a centerline of the diverter panel from a leading edge of the diverter panel to a trailing edge of the diverter panel. At least a portion of the centerline may be non-straight.

The exhaust section may also include an exhaust treatment device disposed in and extending across the first nozzle section.

The second nozzle section may be configured without any internal flow impediments.

The exhaust treatment device may be configured as or otherwise include a catalyst structure.

The exhaust treatment device may be configured as or otherwise include a heat exchanger.

The exhaust section may also include an ejector configured to vent air in a compartment surrounding the core of the gas turbine engine into the exhaust flowpath.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
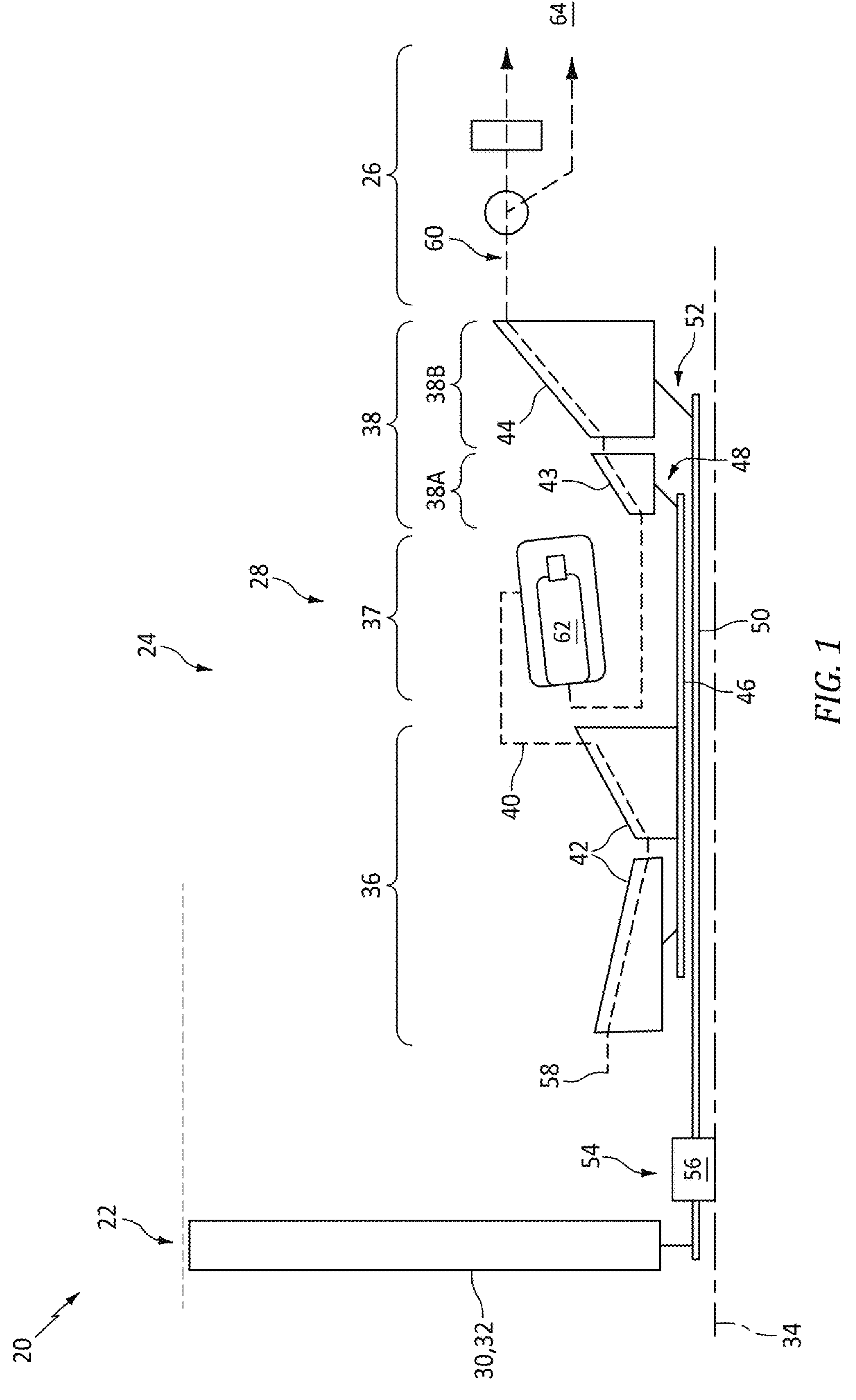
FIG. 1 is a partial schematic illustration of an aircraft powerplant.

FIG. 1 illustrates a powerplant 20 for an aircraft. The aircraft may be an airplane, a helicopter, a drone (e.g., an unmanned aerial vehicle (UAV)) or any other manned or unmanned aerial vehicle or system. The aircraft powerplant 20 may be configured as, or otherwise included as part of, a propulsion system for the aircraft. The aircraft powerplant 20 may also or alternatively be configured as, or otherwise included as part of, an electrical power system for the aircraft. The aircraft powerplant 20 of FIG. 1 includes a mechanical load 22, a gas turbine engine 24 and an exhaust section 26, where a core 28 (e.g., a gas generator) of the gas turbine engine 24 is configured to power operation of the mechanical load 22.

The mechanical load 22 may be configured as or otherwise include a rotor 30 mechanically driven by the engine core 28. This driven rotor 30 may be a bladed propulsor rotor for the aircraft propulsion system. The propulsor rotor may be a ducted propulsor rotor, an open propulsor rotor (e.g., an un-ducted propulsor rotor) or any other type of air mover. For example, where the gas turbine engine 24 is a turbofan engine, the ducted propulsor rotor may be a fan rotor. Where the gas turbine engine 24 is a turboprop engine, the open propulsor rotor may be a propeller rotor 32. Where the gas turbine engine 24 is a turboshaft engine, the open propulsor rotor may be a rotorcraft rotor such as a helicopter main rotor or a helicopter tail rotor. Alternatively, the driven rotor 30 may be configured as a generator rotor of an electric power generator for the aircraft electrical power system; e.g., an auxiliary power unit (APU) system. The present disclosure, however, is not limited to the foregoing exemplary mechanical loads nor to the foregoing exemplary gas turbine engines. The gas turbine engine 24, for example, may alternatively be configured as a turbojet engine, a propfan engine, a pusher fan engine or any other type of gas turbine engine operable to power the operation of the mechanical load 22. However, for ease of description, the gas turbine engine 24 is generally described below as the turboprop engine, and the driven rotor 30 is described below as the propeller rotor 32.

The aircraft powerplant 20 extends axially along an axis 34 from a forward, upstream end of the aircraft powerplant 20 to an aft, downstream end of the aircraft powerplant 20. Briefly, this axis 34 may be a centerline axis of the aircraft powerplant 20 and/or one or more of its members. The axis 34 may also be a rotational axis of one or more members of the gas turbine engine 24 and its engine core 28. The engine core 28 of FIG. 1 includes a compressor section 36, a combustor section 37, a turbine section 38 and a (e.g., annular) core flowpath 40. The turbine section 38 of FIG. 1 includes a high pressure turbine (HPT) section 38A and a low pressure turbine (LPT) section 38B, which LPT section 38B of FIG. 1 is a power turbine (PT) section for driving rotation of the propeller rotor 32.

The compressor section 36 includes a compressor rotor 42. The HPT section 38A includes a high pressure turbine (HPT) rotor 43. The LPT section 38B includes a low pressure turbine (LPT) rotor 44. The propeller rotor 32, the compressor rotor 42, the HPT rotor 43 and the LPT rotor 44 each respectively include one or more arrays (e.g., stages) of rotor blades, where the rotor blades in each array are arranged circumferentially around and are connected to a respective rotor disk or hub. The rotor blades in each array, for example, may be formed integral with or mechanically fastened, welded, brazed and/or otherwise attached to the respective rotor disk and/or hub.

The compressor rotor 42 is coupled to and rotatable with the HPT rotor 43. The compressor rotor 42 of FIG. 1, for example, is connected to the HPT rotor 43 by a high speed shaft 46. At least (or only) the compressor rotor 42, the HPT rotor 43 and the high speed shaft 46 collectively form a high speed rotating assembly 48; e.g., a high speed spool of the engine core 28.

The LPT rotor 44 of FIG. 1 is connected to a low speed shaft 50. At least (or only) the LPT rotor 44 and the low speed shaft 50 collectively form a low speed rotating assembly 52; e.g., a low speed spool/a power turbine spool of the engine core 28. This low speed rotating assembly 52 is further coupled to the propeller rotor 32—the driven rotor 30—through a drivetrain 54. This drivetrain 54 may be configured as a geared drivetrain, where a geartrain 56 (e.g., a transmission, a speed change device, etc.) is disposed between and operatively couples the propeller rotor 32 to the low speed rotating assembly 52 and its LPT rotor 44. With this arrangement, the propeller rotor 32 may rotate at a different (e.g., slower) rotational speed than the low speed rotating assembly 52 and its LPT rotor 44. However, the drivetrain 54 may alternatively be configured as a direct drive drivetrain, where the geartrain 56 is omitted. With such an arrangement, the propeller rotor 32 rotates at a common (the same) rotational speed as the low speed rotating assembly 52 and its LPT rotor 44.

The core flowpath 40 extends longitudinally within the gas turbine engine 24 and its engine core 28 from an airflow inlet 58 into the core flowpath 40 to an exhaust flowpath 60 of the exhaust section 26. More particularly, the core flowpath 40 extends from the core inlet 58, sequentially through the compressor section 36, the combustor section 37, the HPT section 38A and the LPT section 38B, to the exhaust flowpath 60.

During operation of the gas turbine engine 24, (e.g., ambient) air is directed into the engine core 28 through the core inlet 58. This air entering the core flowpath 40 may be referred to as core air. The core air is compressed by the compressor rotor 42 and directed into a combustion chamber (e.g., an annular combustion chamber) within a combustor 62 (e.g., an annular combustor) of the combustor section 37. Fuel is injected into the combustion chamber by one or more fuel injectors and mixed with the compressed core air to provide a fuel-air mixture. This fuel-air mixture is ignited and combustion products thereof flow through and sequentially drive rotation of the HPT rotor 43 and the LPT rotor 44 before being exhausted through the exhaust section 26 into an environment 64 external to the aircraft powerplant 20. The rotation of the HPT rotor 43 drives rotation of the compressor rotor 42 and, thus, the compression of the air received from the core inlet 58. The rotation of the LPT rotor 44 drives rotation of the propeller rotor 32 the driven rotor 30. The rotation of the propeller rotor 32 of FIG. 1 propels air outside of the engine core 28 and, more particularly, air within the external environment 64 to provide forward aircraft thrust.

Figure 2A:
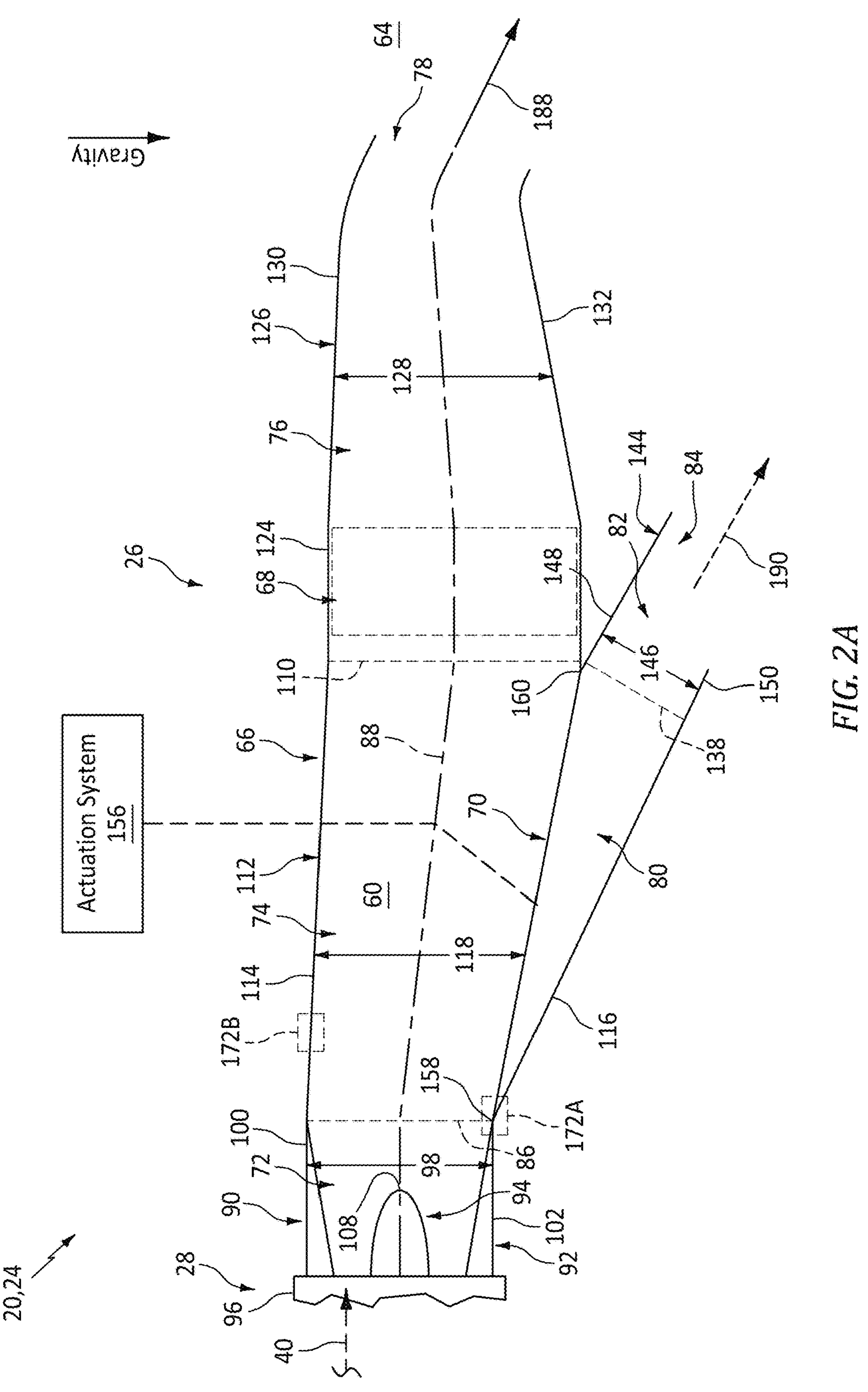
FIG. 2A is a partial sectional illustration of a portion of the aircraft powerplant at an exhaust section with a diverter panel in a first position.
Figure 2B:
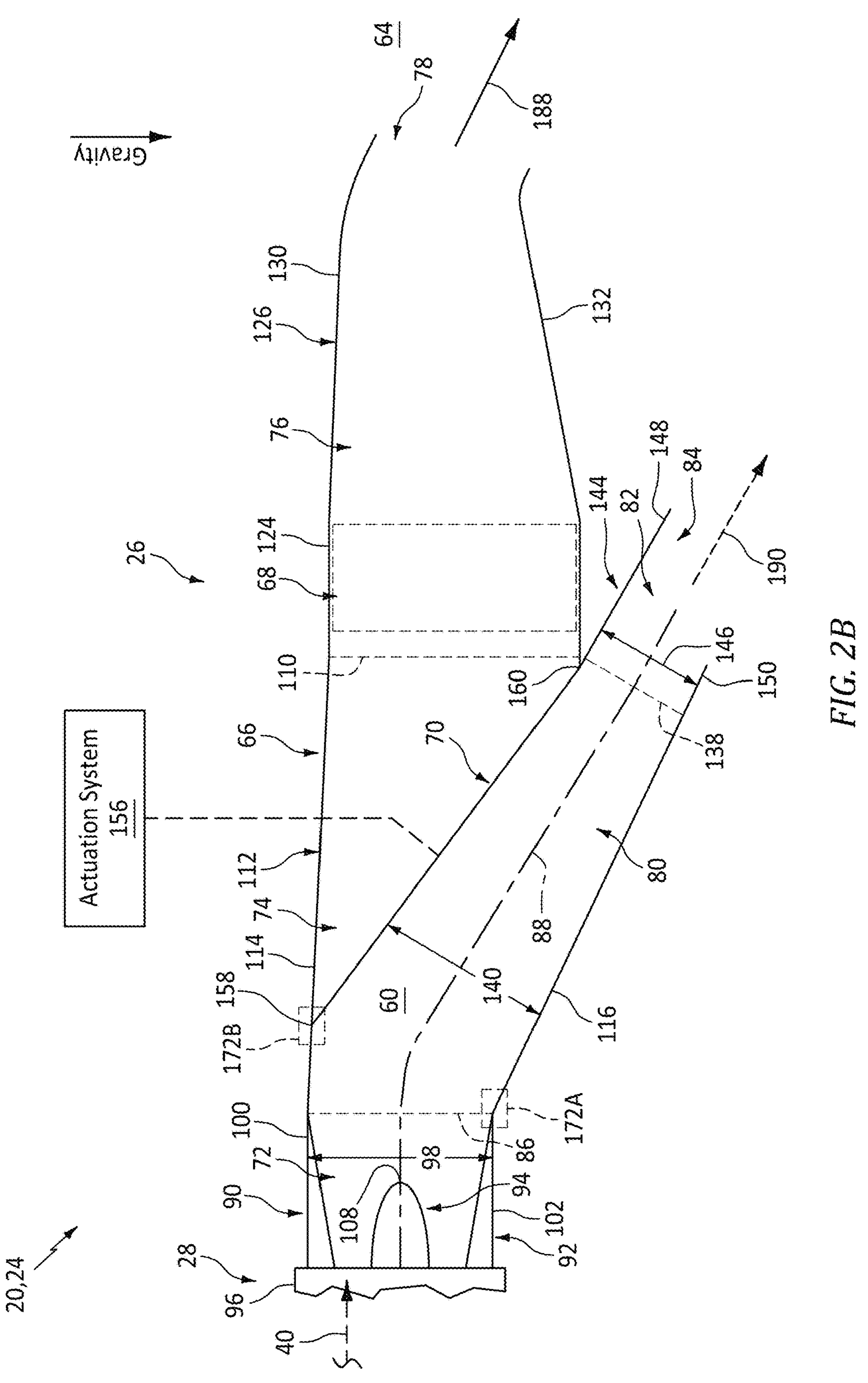
FIG. 2B is a partial sectional illustration of a portion of the aircraft powerplant at the exhaust section with the diverter panel in a second position.

Referring to FIGS. 2A and 2B, the exhaust section 26 includes the exhaust flowpath 60, a flow diverter 66 and an exhaust treatment device 68. Briefly, the flow diverter 66 includes a diverter panel 70 (e.g., a door, a valve flap, etc.) configured to be disposed in a first arrangement (e.g., see FIG. 2A) and in a second arrangement (e.g., see FIG. 2B). When the diverter panel 70 is in its first arrangement of FIG. 2A, the exhaust flowpath 60 includes an upstream diffuser section 72, a first diverter section 74 and a first nozzle section 76. In this first arrangement of FIG. 2A, the exhaust flowpath 60 extends longitudinally from the engine core 28 and its core flowpath 40, sequentially through the exhaust flowpath sections 72, 74 and 76, to a first nozzle outlet 78 from the exhaust section 26 and its first nozzle section 76. By contrast, when the diverter panel 70 is in its second arrangement of FIG. 2B, the exhaust flowpath 60 includes the diffuser section 72, a second diverter section 80 and a second nozzle section 82. In this second arrangement of FIG. 2B, the exhaust flowpath 60 extends longitudinally from the engine core 28 and its core flowpath 40, sequentially through the exhaust flowpath sections 72, 80 and 82, to a second nozzle outlet 84 from the exhaust section 26 and its second nozzle section 82.

Referring to FIGS. 2A and 2B, the diffuser section 72 is fluidly coupled to and downstream of the core flowpath 40. This diffuser section 72 extends longitudinally from the engine core 28 and its core flowpath 40 to an inlet 86 into the flow diverter 66. The diffuser section 72 has a cross-sectional flow area when viewed, for example, in a reference plane perpendicular to a longitudinal centerline 88 of the exhaust flowpath 60 along the diffuser section 72. This diffuser section cross-sectional flow area (e.g., continuously or incrementally) increases as the diffuser section 72 extends in a longitudinal downstream direction. The diffuser section cross-sectional flow area of FIGS. 2A and 2B, for example, increases as the diffuser section 72 extends longitudinally from (or about) the engine core 28/the core flowpath 40 to (or about) the flow diverter 66. The diffuser section 72 to FIGS. 2A and 2B, for example, is formed by a diffuser structure 90 which includes an outer diffuser duct 92 and an inner exhaust cone 94; e.g., an exhaust center body, an exhaust bullet, an exhaust tail cone, etc. However, in other embodiments, it is contemplated the exhaust cone 94 may alternatively be omitted from the diffuser structure 90 where, for example, the exhaust cone 94 is upstream of the exhaust section 26.

Figure 3:
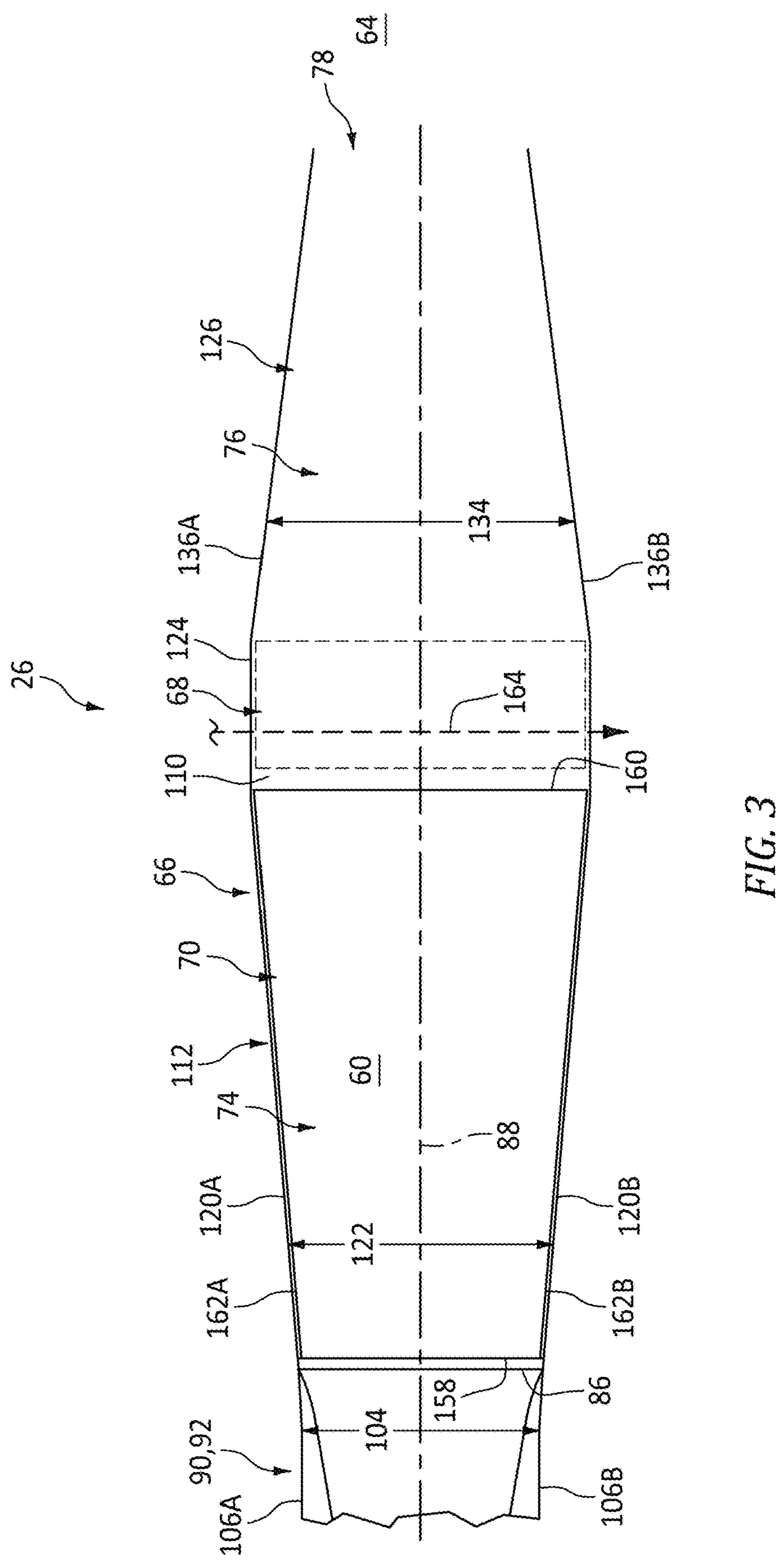
FIG. 3 is a plan view illustration of a portion of the exhaust section along a first nozzle section of an exhaust flowpath.

The diffuser duct 92 forms vertical and lateral outer peripheral boundaries of the diffuser section 72. Briefly, the term "vertical" may describe a vertical up-or-down direction relative to, for example, a direction of gravity; e.g., see vertical plane of FIGS. 2A and 2B. The term "lateral" may describe a horizontal side-to-side direction relative to, for example, the direction of gravity; e.g., see horizontal plane of FIGS. 3 and 4. In addition, for ease of description, the relative directions and orientations are described herein for when the aircraft is on ground or flying in level flight. Referring again to FIGS. 2A and 2B, the diffuser duct 92 may be attached (e.g., mechanically fastened) to a case 96 of the gas turbine engine 24 such as a turbine exhaust case (TEC). The diffuser duct 92 of FIGS. 2A and 2B extends longitudinally along the exhaust flowpath 60 and its diffuser section 72 from the engine core 28 to the flow diverter 66. The diffuser duct 92 of FIGS. 2A and 2B further extends circumferentially around the exhaust flowpath 60 and its diffuser section 72. An interior vertical height 98 of the diffuser duct 92 is measured between vertically opposing sidewalls 100 and 102 of the diffuser duct 92. This diffuser duct height 98 may (e.g., continuously or incrementally) increase in size as the diffuser duct 92 and the diffuser section 72 extend longitudinally from (or about) the core flowpath 40 to (or about) the diverter inlet 86. Referring to FIG. 3, an interior lateral width 104 of the diffuser duct 92 is measured between laterally opposing sidewalls 106A and 106B (generally referred to as "106") of the diffuser duct 92. This diffuser duct width 104 may also or alternatively (e.g., continuously or incrementally) increase in size as the diffuser duct 92 and the diffuser section 72 extend longitudinally from (or about) the core flowpath 40 to (or about) the diverter inlet 86.

Referring to FIGS. 2A and 2B, the exhaust cone 94 forms an inner peripheral boundary of a longitudinal upstream portion of the diffuser section 72. The exhaust cone 94 of FIGS. 2A and 2B, for example, projects partially longitudinally into the exhaust flowpath 60 and its diffuser section 72 from the engine core 28 to a trailing end 108 of the exhaust cone 94. An outer diameter of the exhaust cone 94 (e.g., continuously or incrementally) decreases in size as the exhaust cone 94 projects to its trailing end 108.

Referring to FIG. 2A, when the diverter panel 70 is in its first arrangement, the first diverter section 74 is fluidly coupled to and downstream of the diffuser section 72. This first diverter section 74 extends longitudinally from the diverter inlet 86/the diffuser section 72 to an inlet 110 into the first nozzle section 76. The first diverter section 74 has a cross-sectional flow area when viewed, for example, in a reference plane perpendicular to the longitudinal centerline 88 of the exhaust flowpath 60 along the first diverter section 74. This first diverter section cross-sectional flow area (e.g., continuously or incrementally) increases as the first diverter section 74 extends in the longitudinal downstream direction. The first diverter section cross-sectional flow area of FIG. 2A, for example, increases as the first diverter section 74 extends longitudinally from (or about) the diffuser section 72 to (or about) the first nozzle section 76. The first diverter section 74 of FIG. 2A, for example, is formed by a diverter duct 112 and the diverter panel 70.

The diverter duct 112 extends longitudinally along the exhaust flowpath 60 and its diverter sections 74 and 80. The diverter duct 112 extends circumferentially around the exhaust flowpath 60 and its diverter sections 74 and 80. The diverter duct 112 extends vertically between a vertical first sidewall 114 (e.g., a top sidewall) of the diverter duct 112 and a vertical second sidewall 116 (e.g., a bottom sidewall) of the diverter duct 112. When the diverter panel 70 is in its first arrangement of FIG. 2A, the vertical first sidewall 114 and the diverter panel 70 form vertical outer peripheral boundaries of the first diverter section 74. A vertical height 118 of the first diverter section 74 is measured between the vertical first sidewall 114 and the diverter panel 70. This first diverter section height 118 may (e.g., continuously or incrementally) increase in size as the diverter duct 112 and the first diverter section 74 extend longitudinally from (or about) the diffuser section 72 to (or about) the first nozzle section inlet 110. Referring to FIG. 3, the diverter duct 112 extends laterally between a laterally opposing pair of sidewalls 120A and 120B (generally referred to as "120") of the diverter duct 112. These lateral sidewalls 120 form lateral outer peripheral boundaries of the first diverter section 74. A lateral width 122 of the first diverter section 74 is measured between the lateral sidewalls 120. This first diverter section width 122 may (e.g., continuously or incrementally) increase in size as the diverter duct 112 and the first diverter section 74 extend longitudinally from (or about) the diffuser section 72 to (or about) the first nozzle section inlet 110.

Referring to FIG. 2A, when the diverter panel 70 is in its first arrangement, the first nozzle section 76 is fluidly coupled to and downstream of the first diverter section 74. This first nozzle section 76 extends longitudinally from the first nozzle section inlet 110/the first diverter section 74 to the first nozzle outlet 78. The first nozzle section 76 has a cross-sectional flow area when viewed, for example, in a reference plane perpendicular to the longitudinal centerline 88 of the exhaust flowpath 60 along the first nozzle section 76. This first nozzle section cross-sectional flow area (e.g., continuously or incrementally) decreases as the first nozzle section 76 extends in the longitudinal downstream direction. The first nozzle section cross-sectional flow area of FIG. 2A, for example, decreases as the first nozzle section 76 extends longitudinally from (or about) the exhaust treatment device 68 to (or about) the first nozzle outlet 78. The first nozzle section 76 of FIG. 2A, for example, is formed by a housing 124 (e.g., a frame, a case, etc.) for the exhaust treatment device 68 and a first nozzle duct 126.

The first nozzle duct 126 extends longitudinally along the exhaust flowpath 60 and its first nozzle section 76. The first nozzle duct 126 extends circumferentially around the exhaust flowpath 60 and its first nozzle section 76. The first nozzle duct 126 forms vertical and lateral outer peripheral boundaries of the first nozzle section 76. A vertical height 128 of the first nozzle section 76 is measured between vertically opposing sidewalls 130 and 132 of the first nozzle duct 126. This first nozzle section height 128 may (e.g., continuously or incrementally) decrease in size as the first nozzle duct 126 and the first nozzle section 76 extend longitudinally from (or about) the exhaust treatment device 68 to (or about) the first nozzle outlet 78. Referring to FIG. 3, a lateral width 134 of the first nozzle section 76 is measured between laterally opposing sidewalls 136A and 136B (generally referred to as "136") of the first nozzle duct 126. This first nozzle section width 134 may also or alternatively (e.g., continuously or incrementally) decrease in size as the first nozzle duct 126 and the first nozzle section 76 extend longitudinally from (or about) the exhaust treatment device 68 to (or about) the first nozzle outlet 78.

Referring to FIG. 2B, when the diverter panel 70 is in its second arrangement, the second diverter section 80 is fluidly coupled to and downstream of the diffuser section 72. This second diverter section 80 extends longitudinally from the diverter inlet 86/the diffuser section 72 to an inlet 138 into the second nozzle section 82. The second diverter section 80 has a cross-sectional flow area when viewed, for example, in a reference plane perpendicular to the longitudinal centerline 88 of the exhaust flowpath 60 along the second diverter section 80. This second diverter section cross-sectional flow area may (e.g., continuously or incrementally) decrease as the second diverter section 80 extends in the longitudinal downstream direction. Note, with the arrangement of FIG. 2B, the second diverter section cross-sectional flow area may first slightly increase (e.g., in a horizontal section spanning between points aligned with 172A and 172B) before decreasing until reaching the second nozzle section 82. The second diverter section cross-sectional flow area of FIG. 2B, for example, decreases as the second diverter section 80 extends longitudinally from (or about) the diffuser section 72 to (or about) the second nozzle section 82. The second diverter section 80 of FIG. 2B, for example, is formed by the diverter duct 112 and the diverter panel 70.

Figure 4:
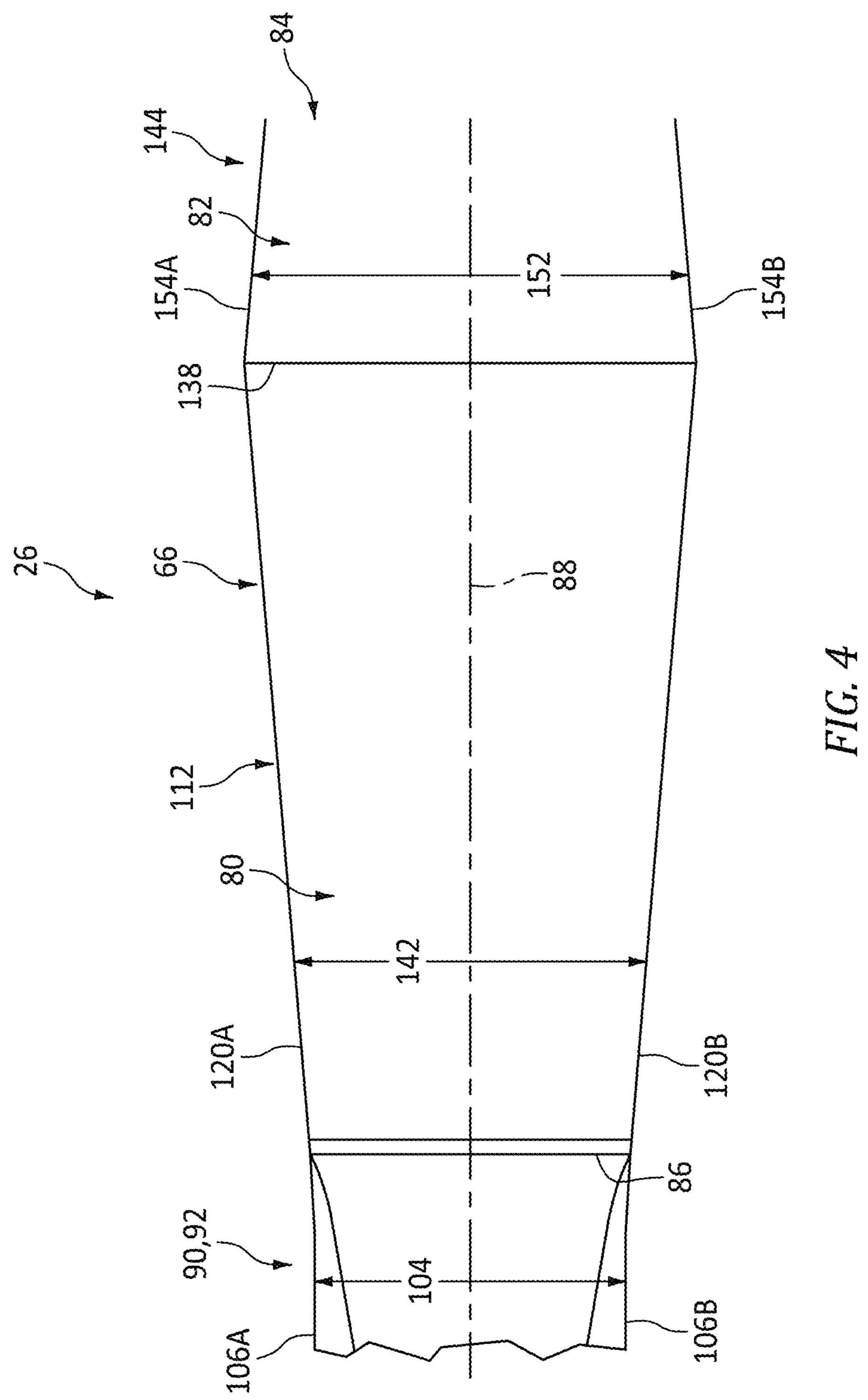
FIG. 4 is a plan view illustration of a portion of the exhaust section along a second nozzle section of the exhaust flowpath.

When the diverter panel 70 is in its second arrangement of FIG. 2B, the vertical second sidewall 116 and the diverter panel 70 form vertical outer peripheral boundaries of the second diverter section 80. A vertical height 140 of the second diverter section 80 is measured between the vertical second sidewall 116 and the diverter panel 70. This second diverter section height 140 may (e.g., continuously or incrementally) decrease in size as the diverter duct 112 and the second diverter section 80 extend longitudinally from (or about) the diffuser section 72 to (or about) the second nozzle section inlet 138. Note, with the arrangement of FIG. 2B, the second diverter section height 140 may first slightly increase (e.g., in the horizontal section spanning between the points aligned with 172A and 172B) before decreasing until reaching the second nozzle section 82. Referring to FIG. 4, the lateral sidewalls 120 form lateral outer peripheral boundaries of the second diverter section 80. A lateral width 142 of the second diverter section 80 is measured between the lateral sidewalls 120. This second diverter section width 142 may (e.g., continuously or incrementally) increase in size as the diverter duct 112 and the second diverter section 80 extend longitudinally from (or about) the diffuser section 72 to (or about) the second nozzle section inlet 138.

Referring to FIG. 2B, when the diverter panel 70 is in its second arrangement, the second nozzle section 82 is fluidly coupled to and downstream of the second diverter section 80. This second nozzle section 82 extends longitudinally from the second nozzle section inlet 138/the second diverter section 80 to the second nozzle outlet 84. The second nozzle section 82 has a cross-sectional flow area when viewed, for example, in a reference plane perpendicular to the longitudinal centerline 88 of the exhaust flowpath 60 along the second nozzle section 82. This second nozzle section cross-sectional flow area may (e.g., continuously or incrementally) decrease as the second nozzle section 82 extends in the longitudinal downstream direction. The second nozzle section cross-sectional flow area of FIG. 2B, for example, decreases as the second nozzle section 82 extends longitudinally from (or about) the exhaust treatment device 68 to (or about) the second nozzle outlet 84. The second nozzle section 82 of FIG. 2B, for example, is formed by a second nozzle duct 144.

The second nozzle duct 144 extends longitudinally along the exhaust flowpath 60 and its second nozzle section 82. The second nozzle duct 144 extends circumferentially around the exhaust flowpath 60 and its second nozzle section 82. The second nozzle duct 144 forms vertical and lateral outer peripheral boundaries of the second nozzle section 82. A vertical height 146 of the second nozzle section 82 is measured between vertically opposing sidewalls 148 and 150 of the second nozzle duct 144. This second nozzle section height 146 may (e.g., continuously or incrementally) decrease in size as the second nozzle duct 144 and the second nozzle section 82 extend longitudinally from (or about) the flow diverter 66/the second diverter section 80 to (or about) the second nozzle outlet 84. Referring to FIG. 4, a lateral width 152 of the second nozzle section 82 is measured between laterally opposing sidewalls 154A and 154B (generally referred to as "154") of the second nozzle duct 144. This second nozzle section width 152 may remain uniform (e.g., constant) or decrease in size as the second nozzle duct 144 and the second nozzle section 82 extend longitudinally from (or about) the exhaust treatment device 68 to (or about) the second nozzle outlet 84.

In some embodiments, the second nozzle outlet 84 may be sized similar to the first nozzle outlet 78. The cross-sectional flow area of the second nozzle section 82 at the second nozzle outlet 84, for example, may be equal to the cross-sectional flow area of the first nozzle section 76 at the first nozzle outlet 78, or may be adjusted to maintain consistent engine operating conditions, or consistent aircraft handling characteristics, when operating in the first or second diverter panel arrangements (e.g., within 20% of the cross-sectional flow area of the first nozzle section 76 at the first nozzle outlet 78).

Referring to FIGS. 2A and 2B, the flow diverter 66 includes the diverter panel 70, the diverter duct 112 and an actuation system 156. The diverter panel 70 extends longitudinally between an upstream, leading edge 158 of the diverter panel 70 and a downstream, trailing edge 160 of the diverter panel 70. Referring to FIG. 3, the diverter panel 70 extends laterally between opposing lateral sides 162A and 162B (generally referred to as "162") of the diverter panel 70. Each of these lateral sides 162 of the diverter panel 70 is disposed laterally next to (e.g., slightly spaced from for clearance without any intervening bodies) the respective lateral sidewall 120 of the diverter duct 112. At (e.g., on, adjacent or proximate) the panel trailing edge 160, the diverter panel 70 is pivotally coupled to a stationary structure of the aircraft powerplant 20; e.g., the diverter duct 112 or another nearby support structure. With this arrangement, the actuation system 156 is configured to pivot the diverter panel 70 about a (e.g., horizontal) pivot axis between (a) a first position (e.g., see FIG. 2A) when the diverter panel 70 is in its first arrangement and (b) a second position (e.g., see FIG. 2B) when the diverter panel 70 is in its second arrangement.

When the diverter panel 70 is in the first position of FIG. 2A, the panel leading edge 158 may be abutted against the vertical second sidewall 116 of the diverter duct 112. In this first position of FIG. 2A, the diverter panel 70 blocks off a flow of the combustion products from the second nozzle section 82 while guiding the flow of the combustion products to the first nozzle section 76. The flow diverter 66 may thereby fluidly couple the diffuser section 72 to the first nozzle section 76 while fluidly decoupling the diffuser section 72 from the second nozzle section 82. By contrast, when the diverter panel 70 is in the second position of FIG. 2B, the panel leading edge 158 may be abutted against the vertical first sidewall 114 of the diverter duct 112. In this second position of FIG. 2B, the diverter panel 70 blocks off the flow of the combustion products from the first nozzle section 76 while guiding the flow of the combustion products to the second nozzle section 82. The flow diverter 66 may thereby fluidly couple the diffuser section 72 to the second nozzle section 82 while fluidly decoupling the diffuser section 72 from the first nozzle section 76.

The exhaust treatment device 68 of FIGS. 2A and 3 is configured to treat the combustion products produced by the operation of the gas turbine engine 24 as described above. This treatment may be operable to reduce or eliminate a quantity of one or more compounds which may be part of and/or entrained in the combustion products. The treatment may also or alternatively be operable to change one or more physical properties (e.g., temperature, pressure, flow rate, etc.) of the combustion products flowing within the first nozzle section 76 through the exhaust treatment device 68 and/or one or more physical properties (e.g., temperature, pressure, flow rate, etc.) of another working fluid flowing along another passage 164 (see FIG. 3) through the exhaust treatment device 68. The exhaust treatment device 68 of FIGS. 2A and 3 is disposed in and extends vertically and laterally across the exhaust flowpath 60 and its first nozzle section 76. With this arrangement, the flow of combustion products flows through and/or otherwise along the exhaust treatment device 68 before being directed out of the exhaust section 26 through the first nozzle outlet 78.

In some embodiments, the exhaust treatment device 68 may be configured as or otherwise include a heat exchanger; e.g., a condenser or an evaporator. When configured as the condenser, the exhaust treatment device 68 may condense water vapor and/or other fluid vapors within the combustion products for subsequent capture and/or use. This may reduce or eliminate formation of a condensation trail (e.g., a contrail) during operation of the gas turbine engine 24. When configured as the evaporator, the exhaust treatment device 68 may heat up and/or vaporize the other working fluid to reclaim waste heat energy that may otherwise be discarded by exhausting the heated combustion products. Examples of the other working fluid include, but are not limited to, a heat exchanger fluid and fuel. Examples of the fuel include, but are not limited to, hydrogen fuel (e.g., liquid hydrogen), liquid natural gas or the like. In the case of fuel, the heating of the fuel may also place the fuel into better condition for injection into the combustor 62 (see FIG. 1).

In some embodiments, the exhaust treatment device 68 may also or alternatively be configured to reduce a concentration of air pollutants such as, but not limited to, nitrogen oxides ($NO_x$) from the combustion products. The exhaust treatment device 68, for example, may include a (e.g., monolithic) catalyst structure configured for the treatment of $NO_x$ within the combustion products. The catalyst structure may be constructed from a ceramic material forming a plurality of substrate cells defining a respective plurality of channels through the catalyst structure. The catalyst structure may include a catalyst wash coat applied to the surfaces of the substrate cells. The catalyst wash coat serves as a carrier for a catalyst such as, but not limited to, platinum, palladium, rhodium, and/or zeolite. This catalyst is used to stimulate and accelerate a $NO_x$ reduction chemical reaction of the catalyst structure. The present disclosure, however, is not limited to any particular form or configuration of the exhaust treatment device 68.

The aircraft powerplant 20 of FIG. 1 may operate in various modes of operation. During one or more treatment modes, the actuation system 156 of FIG. 2A pivots the diverter panel 70 to its first position to direct the flow of combustion products through the first nozzle section 76 and the exhaust treatment device 68 before being exhausted into the external environment 64 through the first nozzle outlet 78. During these treatment modes of operation, the exhaust treatment device 68 treats the combustion products prior to being exhausted. While treating the combustion products has various advantages, one or more performance deficits may be incurred under certain operating conditions. Therefore, during one or more bypass modes, the actuation system 156 of FIG. 2B pivots the diverter panel 70 to its second position to direct the flow of combustion products through the second nozzle section 82 for being exhausted into the external environment 64 through the second nozzle outlet 84. The combustion products thereby (e.g., completely) bypass the exhaust treatment device 68. It may be useful to operate the aircraft powerplant 20 in one of its bypass modes of operation when, for example, there is a need to increase powerplant performance; e.g., increased thrust. It may also or alternatively be useful to operate the aircraft powerplant 20 in one of its bypass modes of operation when, for example, the other working fluid is not directed through the exhaust treatment device 68. For example, the aircraft powerplant 20 may be configured to operate on multiple fuels including hydrogen fuel and a hydrocarbon fuel (e.g., kerosene, sustainable aviation fuel (SAF), etc.). When the aircraft powerplant 20 is switched from operating with the hydrogen fuel to the hydrocarbon fuel, the hydrogen fuel may no longer flow through the exhaust treatment device 68 (e.g., the heat exchanger). The aircraft powerplant 20 may thereby be operated in one of its bypass modes of operation to increase operational performance. The exhaust section 26 of the present disclosure is configured such that the diverter panel 70 may be moved between its first and its second positions during aircraft powerplant operation, both during aircraft flight as well as on-ground. Of course, it is also contemplated the diverter panel 70 may be moved between its first and its second positions while the aircraft powerplant 20 is non-operational; e.g., for maintenance, etc. In some embodiments, the actuation system 156 may be configured such that during a failure mode, the diverter panel 70 is moved to or remains in the second position of FIG. 2B.

Figure 5A:
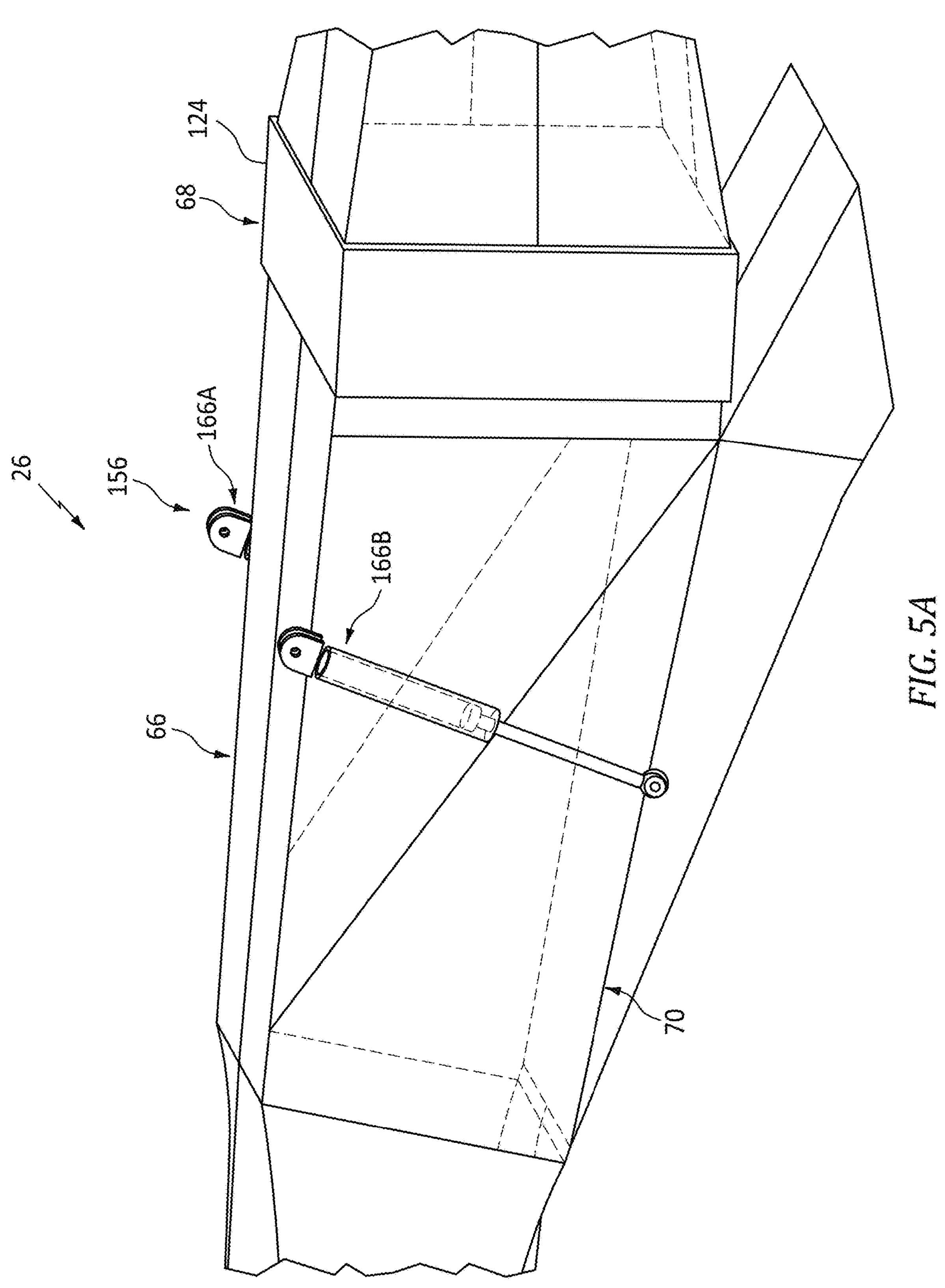
FIGS. 5A and 5B are partial perspective illustrations of the exhaust section with its diverter panel in various positions.
Figure 5B:
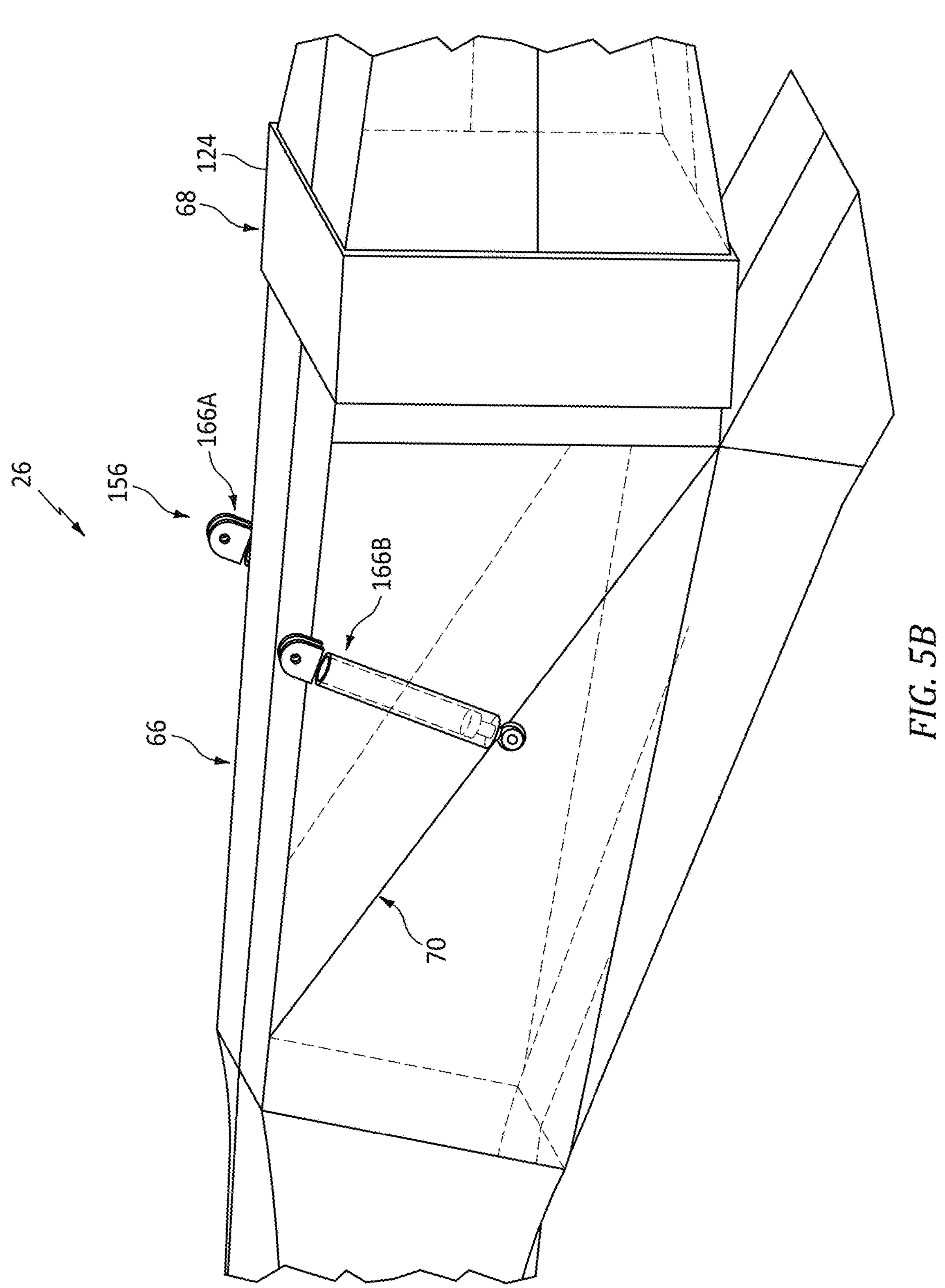

In some embodiments, referring to FIGS. 5A and 5B, the actuation system 156 may include one or more linear actuators 166A and 166B (generally referred to as "166"); e.g., hydraulic piston actuators. Each of these linear actuators 166 extends between and is coupled to the diverter panel 70 and a stationary support structure (not shown in FIGS. 5A and 5B for clarity of illustration). The linear actuators 166 of FIGS. 5A and 5B are disposed vertically above the diverter panel 70. With this arrangement, the linear actuators 166 may push against the diverter panel 70 to pivot the diverter panel 70 down from the second position of FIG. 5B to the first position of FIG. 5A. Here, each linear actuator 166 takes advantage of using its larger hydraulic fluid volume next to its piston for pushing the diverter panel 70 against the flow of the combustion products. By contrast, the linear actuators 166 may pull against the diverter panel 70 to pivot the diverter panel 70 up from the first position of FIG. 5A to the second position of FIG. 5B. Here, the flow of the combustion products against the diverter panel 70 may assist the linear actuators 166 to pivot the diverter panel 70 up. With this arrangement, the actuation system 156 is configured such that during a failure mode, the diverter panel 70 is pushed into or remains in the second position of FIG. 2B.

Figure 6B:
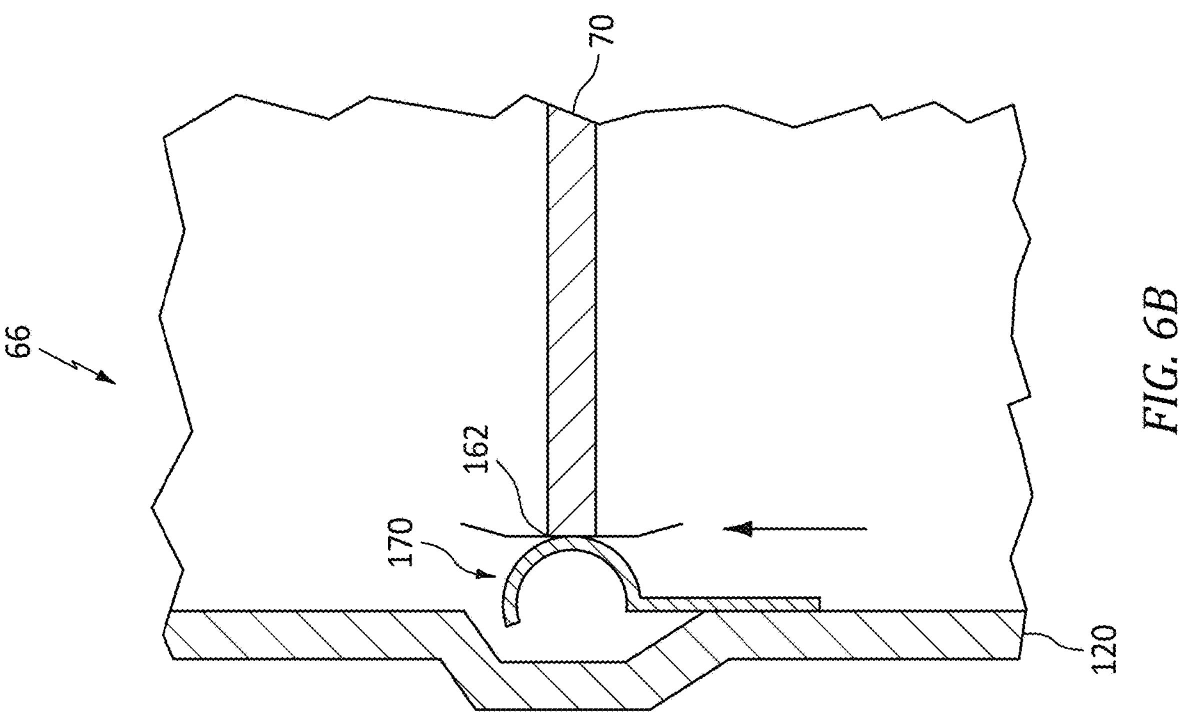
FIGS. 6A and 6B are partial sectional illustrations of a flow diverter along sealed interfaces between the diverter panel and a duct sidewall.
Figure 6A:
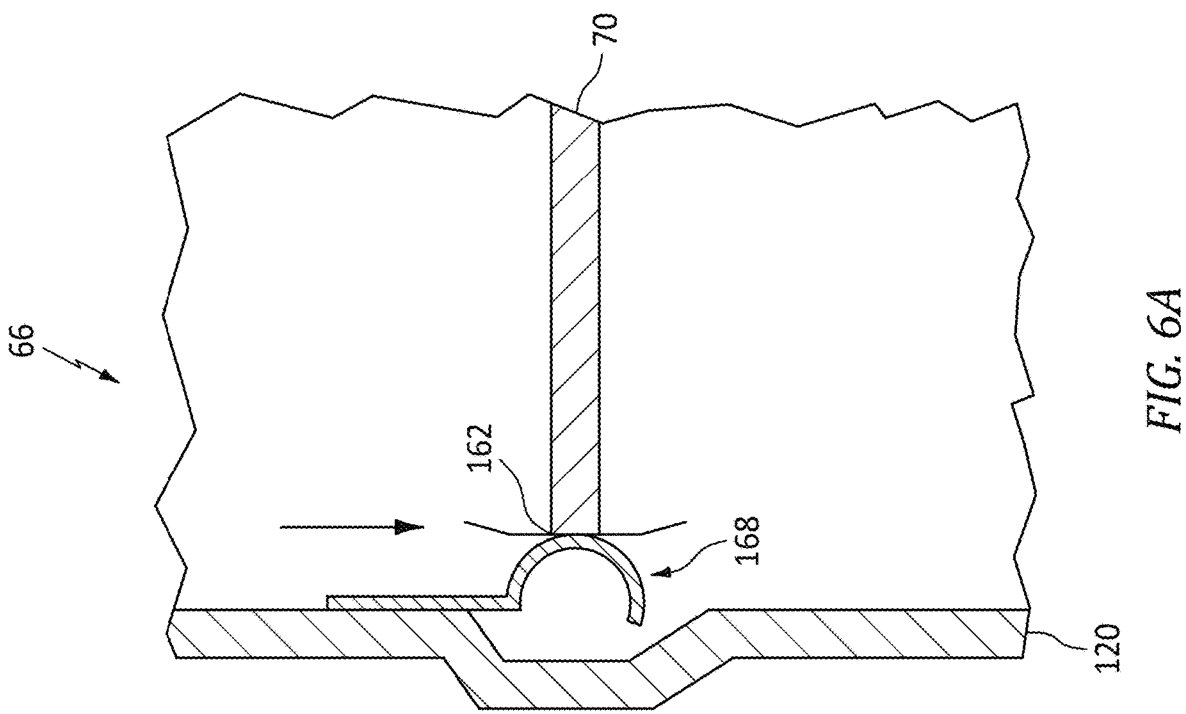

In some embodiments, referring to FIG. 6A, a seal 168 may be mounted to each respective lateral sidewall 120. This seal 168 is configured to seal a lateral clearance gap between the diverter panel 70 and the diverter duct 112 when the diverter panel 70 is in its first position; e.g., see FIG. 2A.

In some embodiments, referring to FIG. 6B, a seal 170 may be mounted to each respective lateral sidewall. This seal 170 is configured to seal a lateral clearance gap between the diverter panel 70 and the diverter duct 112 when the diverter panel 70 is in its second position; e.g., see FIG. 2B.

Figures 7A, 7B:
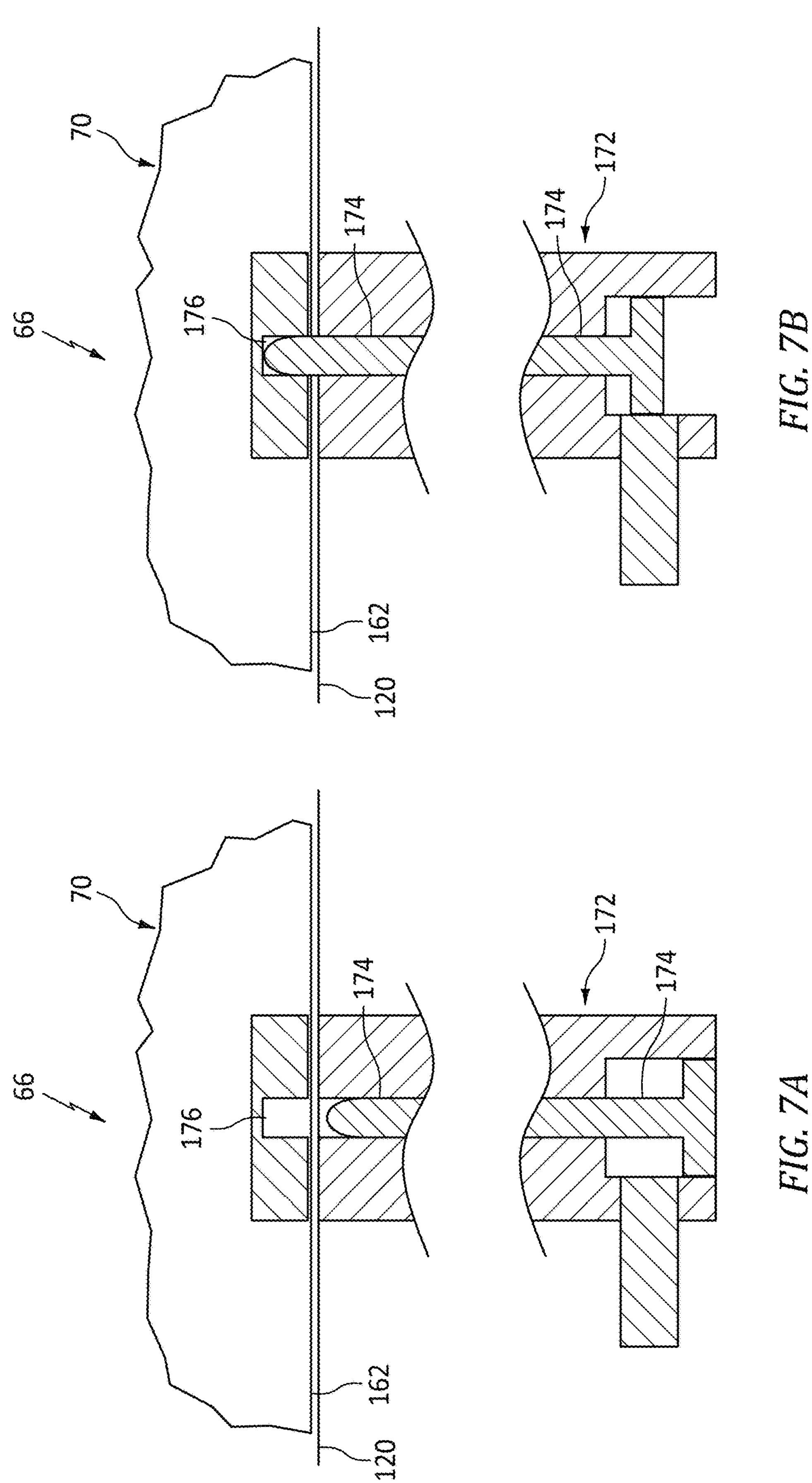
FIGS. 7A and 7B are partial schematic illustrations of the flow diverter at a lock in various arrangements.

In some embodiments, referring to FIGS. 7A and 7B, a lock 172 may be mounted to the diverter duct 112 and its lateral sidewall 120. This lock 172 includes a pin 174 which may translate between an unlocked position (e.g., see FIG. 7A) and a locked position (e.g., see FIG. 7B). When the pin 174 is in its unlocked position of FIG. 7A, the diverter panel 70 is free to move relative to the diverter duct 112 and its lateral sidewall 120. However, when the pin 174 is in its locked position of FIG. 7B, the pin 174 may project into a receptacle 176 in the diverter panel 70. The pin 174 may thereby lock the diverter panel 70 to the diverter duct 112 and its lateral sidewall 120. Such locks 172A and 172B (generally referred to as "172") may be provided to lock movement of the diverter panel 70 in its first position of FIG. 2A and/or in its second position of FIG. 2B.

Figure 8:
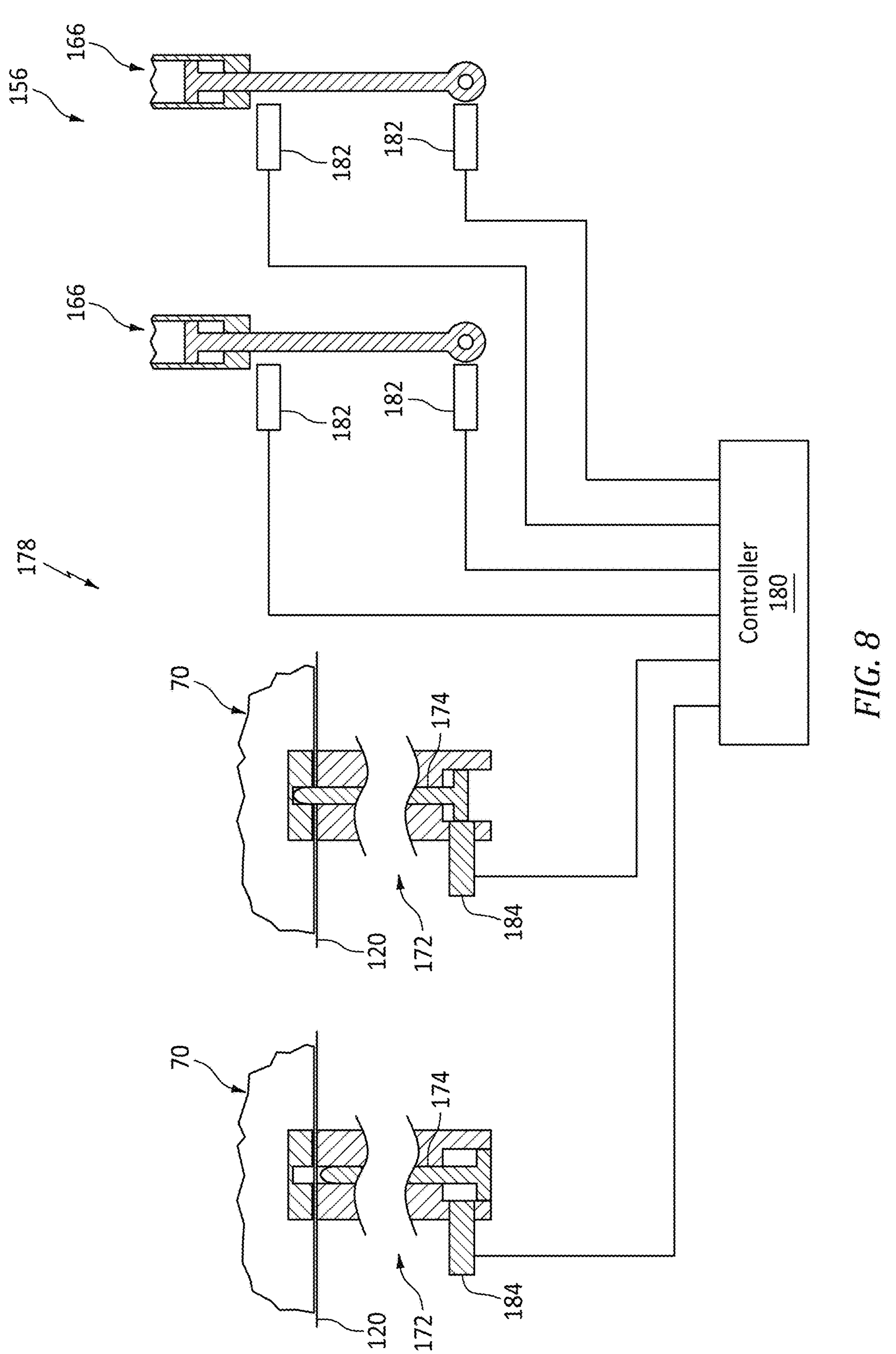
FIG. 8 is a schematic illustration of a sensor system for the flow diverter.

In some embodiments, referring to FIG. 8, a sensor system 178 may be included to monitor a position of the diverter panel 70 and/or a status of one or more of the locks 172. The sensor system 178 of FIG. 8, for example, includes a controller 180 in signal communication with one or more actuator sensors 182; e.g., position switches, proximity sensors, etc. One of these actuator sensors 182 may be configured to determine if the respective linear actuator 166 is extended and, thus, if the diverter panel 70 is in its first position; e.g., see FIG. 2A. Another one of these actuator sensors 182 may be configured to determine if the respective linear actuator 166 is retracted and, thus, if the diverter panel 70 is in its second position; e.g., see FIG. 2B. The sensor system 178 may also include one or more lock sensors 184 (e.g., position switches, proximity sensors, etc.) in signal communication with the controller 180. Each lock sensor 184 may be configured to determine if a respective pin 174 is in its unlocked position of FIG. 7A or its locked position of FIG. 7B.

Figures 9A, 9B, 9C:
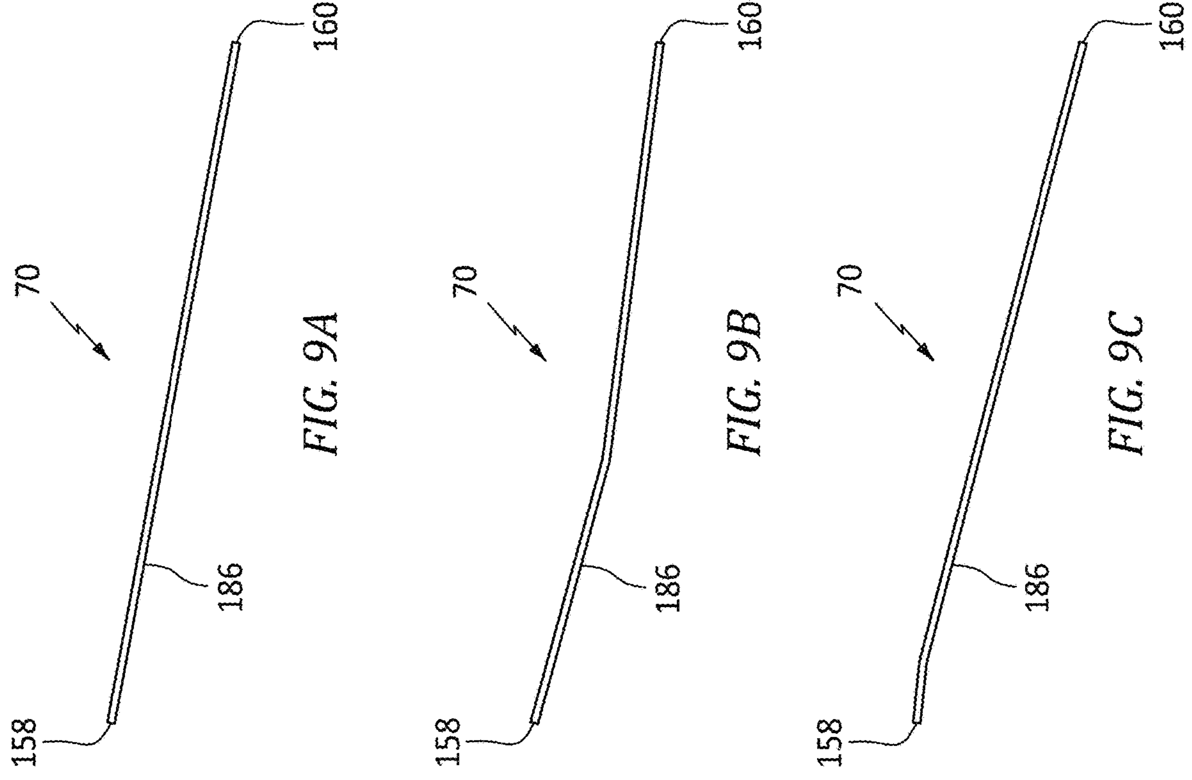
FIGS. 9A-C are schematic side illustrations of the diverter panel with various longitudinal geometries.

Referring to FIGS. 9A-C, the diverter panel 70 extends longitudinally along a centerline 186 of the diverter panel 70 from the panel leading edge 158 to the panel trailing edge 160 when viewed, for example, in a plane perpendicular to the diverter panel 70. In some embodiments, referring to FIG. 9A, at least a portion or an entirety of the panel centerline 186 may be straight. In other embodiments, referring to FIG. 9B, at least a portion of the panel centerline 186 may be bent. In other embodiments, referring to FIG. 9C, at least a portion of the panel centerline 186 may be curved; e.g., arcuate, splined, etc. By changing a geometry of the panel centerline 186, diffusion characteristics of the first diverter section 74 may be tailored.

Figures 10A, 10B, 10C:
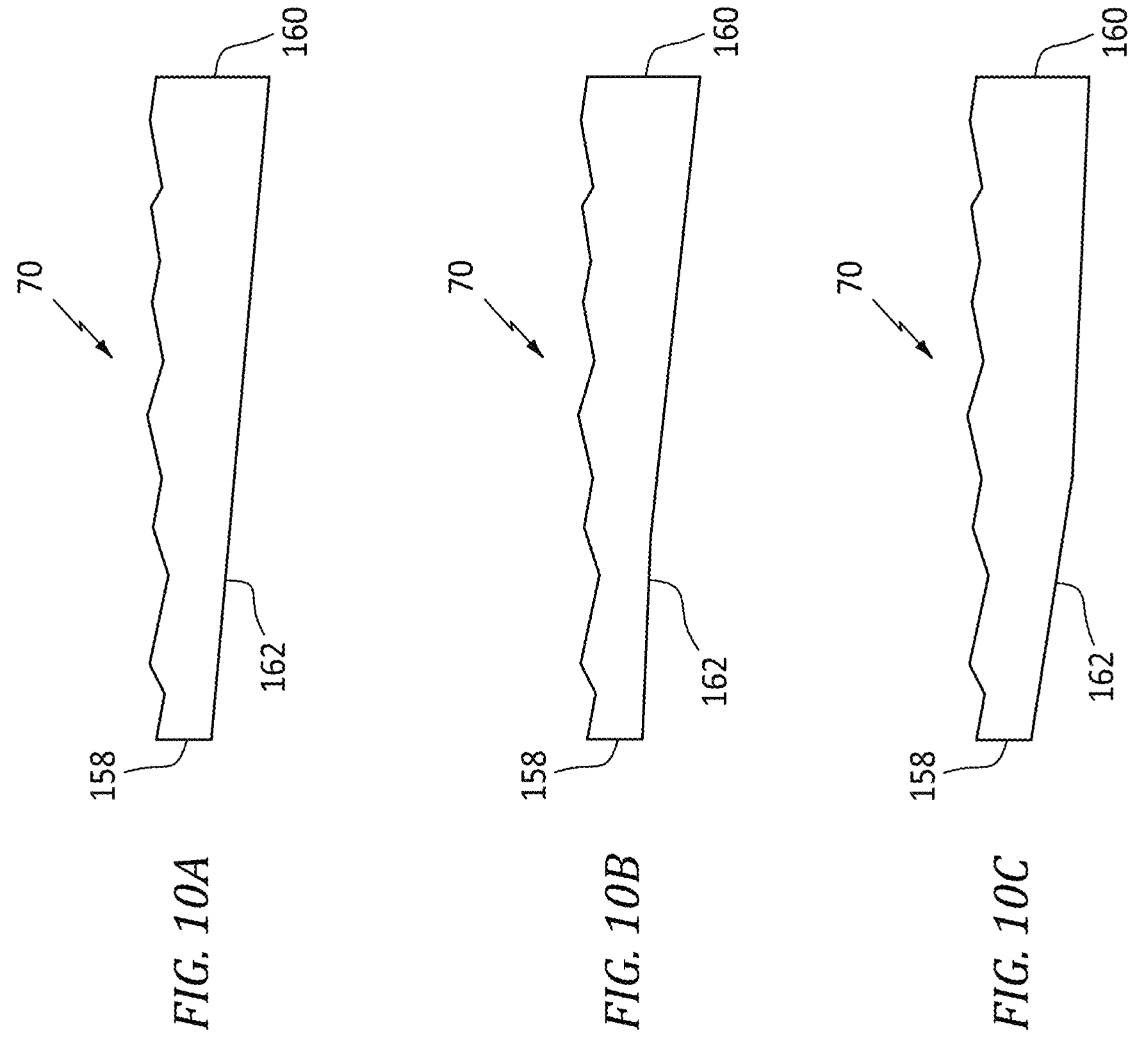
FIGS. 10A-C are plan view illustrations of a portion of the diverter panel with various side geometries.

Referring to FIGS. 10A-C, each lateral side 162 of the diverter panel 70 follows a trajectory when viewed, for example, in a panel parallel with the diverter panel 70. In some embodiments, referring to FIG. 10A, at least a portion or an entirety of the lateral side 162 of the diverter panel 70 may be straight. In other embodiments, referring to FIG. 10B, at least a portion of the lateral side 162 of the diverter panel 70 may be concave. In other embodiments, referring to FIG. 10C, at least a portion of the lateral side 162 of the diverter panel 70 may be convex. By changing a geometry of the lateral side 162 of the diverter panel 70, diffusion characteristics of the first diverter section 74 may be tailored.

Figure 11:
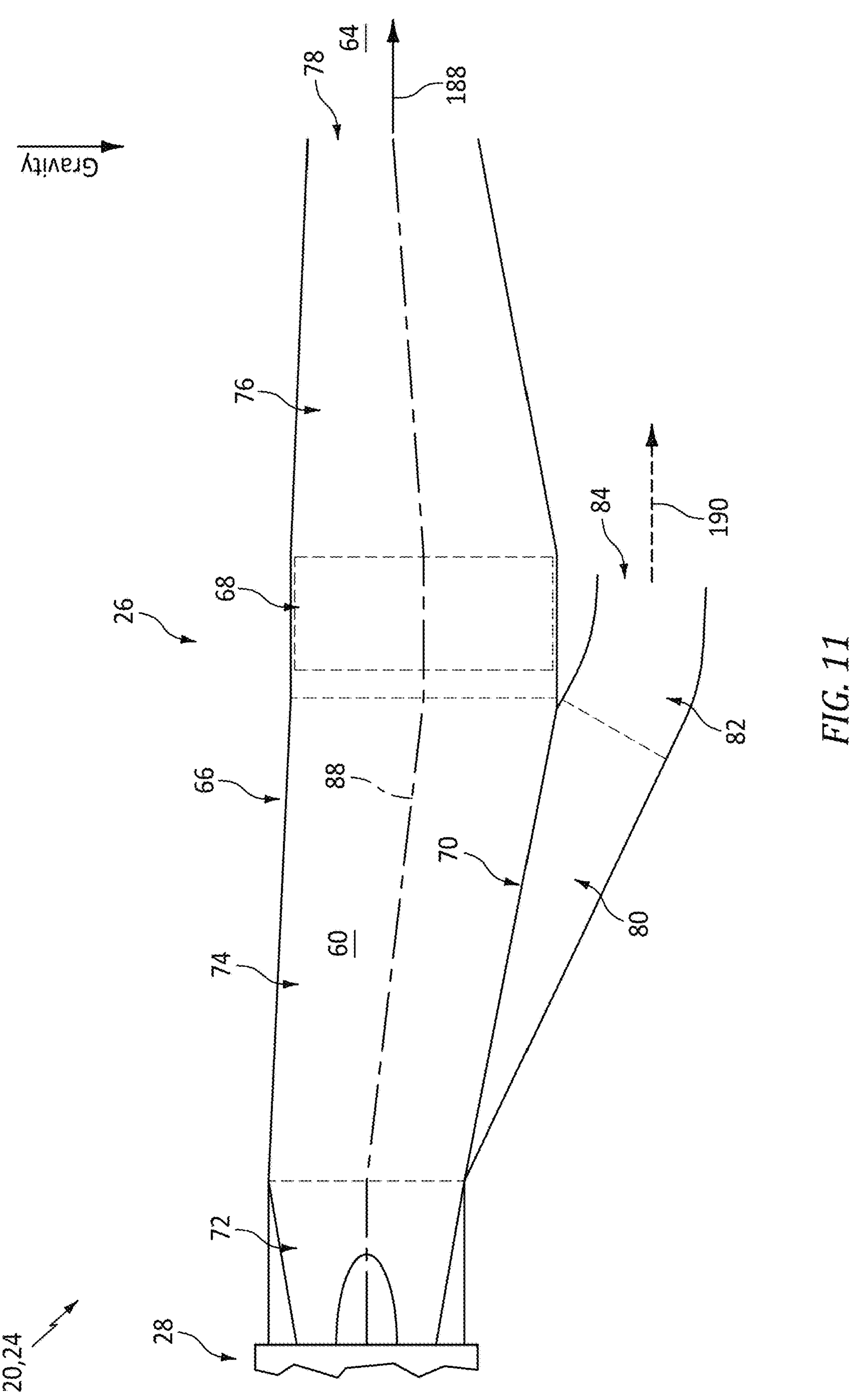
FIG. 11 is a partial sectional illustration of a portion of the aircraft powerplant at the exhaust section with another nozzle arrangement.
Figure 12:
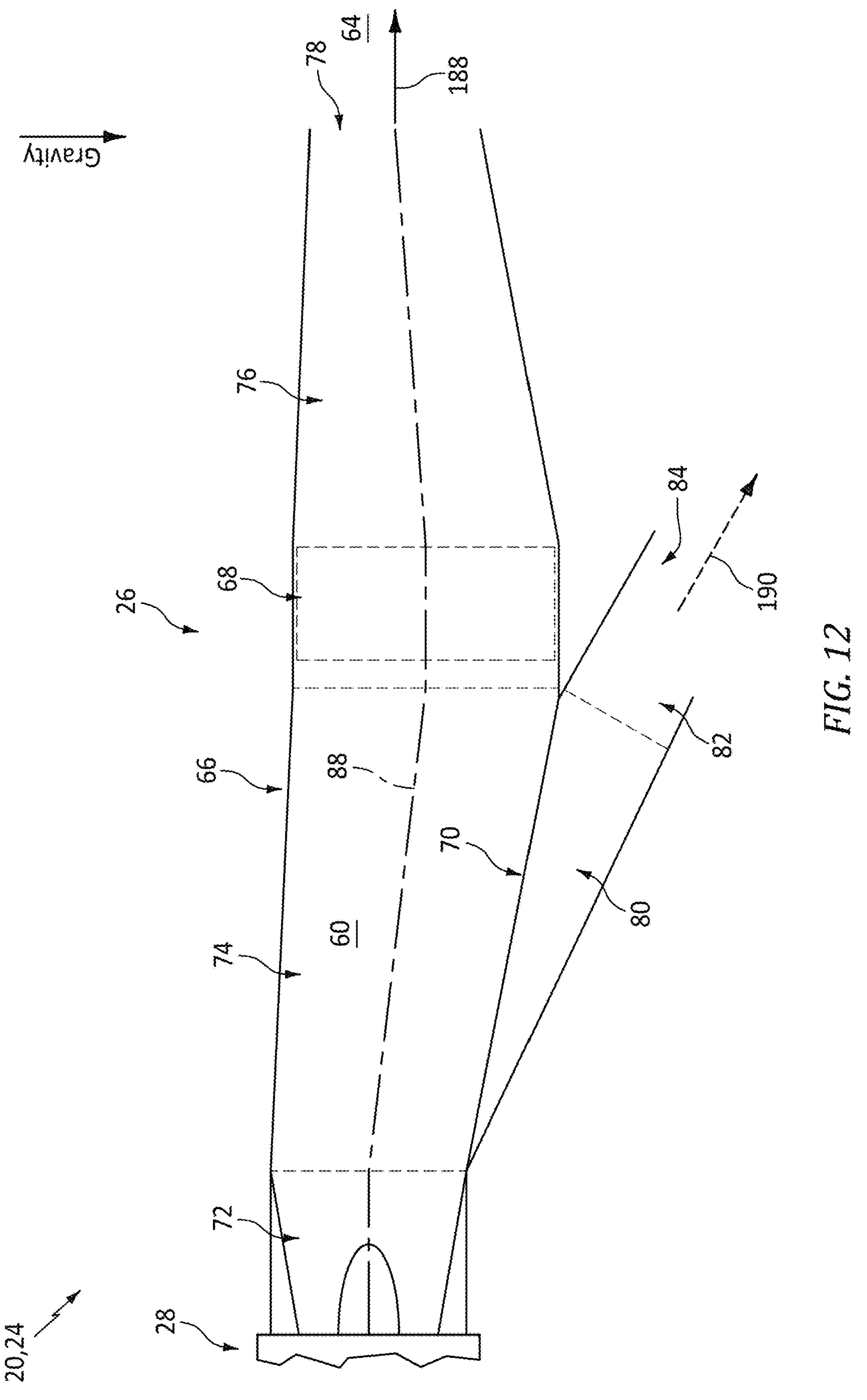
FIG. 12 is a partial sectional illustration of a portion of the aircraft powerplant at the exhaust section with still another nozzle arrangement.

Referring to FIG. 2A, the first nozzle section 76 is configured to direct the combustion products out of the aircraft powerplant 20 and its exhaust section 26 through the first nozzle outlet 78 and into the external environment 64 along a first longitudinal trajectory 188. Referring to FIG. 2B, the second nozzle section 82 is configured to direct the combustion products out of the aircraft powerplant 20 and its exhaust section 26 through the second nozzle outlet 84 and into the external environment 64 along a second longitudinal trajectory 190. The second longitudinal trajectory 190 may be the same as the first longitudinal trajectory, or angularly offset from the first longitudinal trajectory 188 by an offset angle equal to or less than forty-five degrees (45°). Here, the trajectories 188 and 190 may be adjusted to maintain consistent engine operating conditions, or consistent aircraft handling characteristics, when operating in the first or second diverter panel arrangements. While the arrangement of FIGS. 2A and 2B have the first longitudinal trajectory 188 and the second longitudinal trajectory 190 pointing vertically downward, it is contemplated one or more of the first longitudinal trajectory 188 and/or the second longitudinal trajectory 190 may alternatively be horizontal (e.g., parallel with a horizon line) as shown, for example, in FIGS. 11 and 12.

Figure 13:
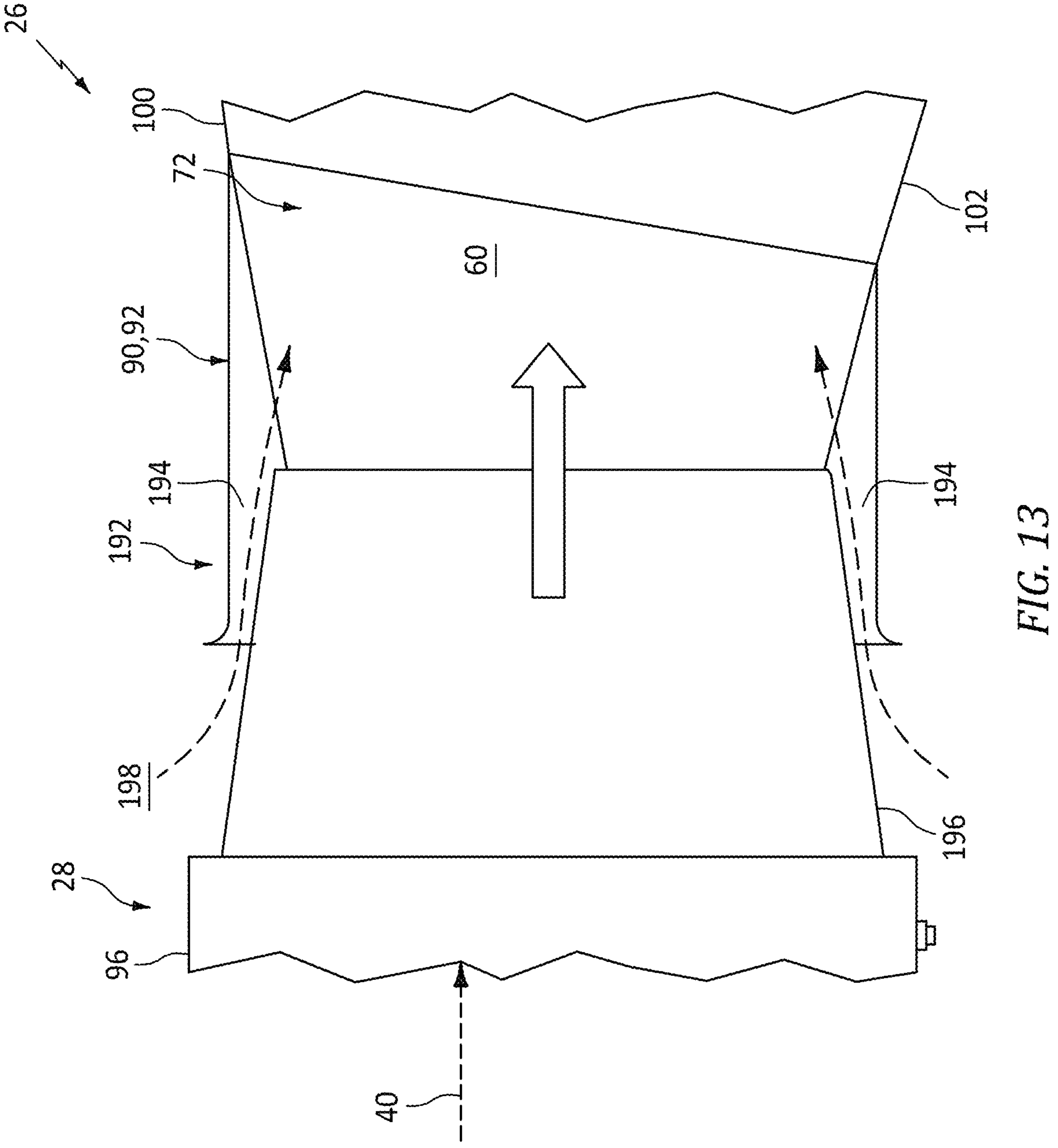
FIG. 13 is a cutaway illustration of an interface between an engine core and the exhaust section with an ejector.

In some embodiments, referring to FIG. 13, the exhaust section 26 may also be configured with an ejector 192. The ejector 192 of FIG. 13 includes an (e.g., annular) ejector passage 194 radially between the diffuser duct 92 and a primary nozzle 196 for the engine core 28, where an upstream section of the diffuser duct 92 axially overlaps and circumscribes the primary nozzle 196. The ejector passage 194 extends longitudinally from a compartment 198 surrounding the engine core 28 to the exhaust flowpath 60 and its diffuser section 72, where the compartment 198 is between a housing for the engine core 28 (e.g., a core casement including the engine case 96) and a surrounding nacelle. During operation, the flow of combustion products passing an outlet of the ejector 192 entrains air out of the compartment 198. The ejector 192 may thereby be operable to vent the compartment 198 during aircraft powerplant operation.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A powerplant for an aircraft, comprising:

a core of a gas turbine engine including a core flowpath, a compressor section, a combustor section and a turbine section, the core flowpath extending longitudinally through the compressor section, the combustor section and the turbine section; and an exhaust section including an exhaust flowpath, a first diverter section, a second diverter section and a flow diverter;

the exhaust flowpath fluidly coupled to and downstream of the core flowpath, the exhaust flowpath including a diffuser section, a first nozzle section and a second nozzle section, wherein a cross-sectional flow area of the diffuser section increases in size as the diffuser section extends longitudinally away from the core flowpath, a cross-sectional flow area of the first nozzle section decreases in size as the first nozzle section extends longitudinally towards a first nozzle outlet from the exhaust section, and a cross-sectional flow area of the second nozzle section decreases in size as the second nozzle section extends longitudinally towards a second nozzle outlet from the exhaust section;

the flow diverter comprising a diverter panel configured to pivot about a pivot axis between a first position and a second position, the flow diverter configured to fluidly couple the diffuser section to the first nozzle section and fluidly decouple the diffuser section from the second nozzle section when the diverter panel is in the first position, and the flow diverter configured to fluidly couple the diffuser section to the second nozzle section and fluidly decouple the diffuser section from the first nozzle section when the diverter panel is in the second position;

the first diverter section extending longitudinally through the flow diverter from the diffuser section to the first nozzle section when the diverter panel is in the first position, a cross-sectional flow area of the first diverter section increasing in size as the first diverter section extends longitudinally along a first side of the diverter panel towards the first nozzle section; and the second diverter section extending longitudinally through the flow diverter from the diffuser section to the second nozzle section when the diverter panel is in the second position, a cross-sectional flow area of the second diverter section continuously decreasing in size as the second diverter section extends longitudinally along a second side of the diverter panel to the second nozzle section.

2. The powerplant of claim 1, wherein the gas turbine engine includes an exhaust cone that projects longitudinally into the diffuser section, and the diffuser section extends longitudinally along and circumscribes the exhaust cone.

3. The powerplant of claim 1, wherein the first nozzle section is configured to direct combustion products, received from the diffuser section through the flow diverter, along a first longitudinal trajectory out of the powerplant through the first nozzle outlet;

the second nozzle section is configured to direct the combustion products, received from the diffuser section through the flow diverter, along a second longitudinal trajectory out of the powerplant through the second nozzle outlet; and the second longitudinal trajectory is angularly offset form the first longitudinal trajectory by an acute offset angle.

4. The powerplant of claim 3, wherein the acute offset angle is equal to or less than forty-five degrees.

5. The powerplant of claim 1, wherein the first nozzle section is configured to direct combustion products, received from the diffuser section through the flow diverter, along a first longitudinal trajectory out of the powerplant through the first nozzle outlet, and the first longitudinal trajectory is parallel to a horizon line or is angularly offset from the horizon line and points vertically downward relative to a direction of gravity; and the second nozzle section is configured to direct the combustion products, received from the diffuser section through the flow diverter, along a second longitudinal trajectory out of the powerplant through the second nozzle outlet, and the second longitudinal trajectory is parallel to the horizon line or is angularly offset from the horizon line and points vertically downward relative to the direction of gravity.

6. The powerplant of claim 1, wherein the cross-sectional flow area of the first nozzle section at the first nozzle outlet is within five percent of the cross-sectional flow area of the second nozzle section at the second nozzle outlet.

7. The powerplant of claim 1, wherein the diverter panel is configured to block flow from the diffuser section into the second nozzle section when the diverter panel is in the first position; and the diverter panel is configured to block flow from the diffuser section into the first nozzle section when the diverter panel is in the second position.

8. The powerplant of claim 1, wherein the diverter panel is pivotally coupled to a stationary structure of the exhaust section at a downstream trailing edge of the diverter panel.

9. The powerplant of claim 1, wherein the flow diverter includes a linear actuator arranged vertically above the diverter panel relative to a direction of gravity;

the linear actuator is configured to push against the diverter panel to pivot the diverter panel vertically downwards from the first position to the second position; and the linear actuator is configured to pull against the diverter panel to pivot the diverter panel vertically upwards from the second position to the first position.

10. The powerplant of claim 1, wherein the flow diverter further comprises at least one of a first lock configured to lock the diverter panel in the first position; or a second lock configured to lock the diverter panel in the second position.

11. The powerplant of claim 10, wherein the flow diverter further comprises at least one of a first sensor configured to determine whether the first lock is at least one of locked or unlocked; or a second sensor configured to determine whether the second lock is at least one of locked or unlocked.

12. The powerplant of claim 1, wherein the flow diverter further comprises at least one of a first sensor configured to determine whether the diverter panel is in the first position; or a second sensor configured to determine whether the diverter panel is in the second position.

13. The powerplant of claim 1, wherein the flow diverter further comprises a sidewall and at least one of a first seal mounted to the sidewall, the first seal sealing a gap between the diverter panel and the sidewall when the diverter panel is in the first position; or a second seal mounted to the sidewall, the second seal sealing a gap between the diverter panel and the sidewall when the diverter panel is in the second position.

14. The powerplant of claim 1, wherein the diverter panel extends along a straight centerline of the diverter panel from a leading edge of the diverter panel to a trailing edge of the diverter panel.

15. The powerplant of claim 1, wherein the diverter panel extends along a centerline of the diverter panel from a leading edge of the diverter panel to a trailing edge of the diverter panel, and at least a portion of the centerline is non-straight.

16. The powerplant of claim 1, wherein the exhaust section further includes an exhaust treatment device disposed in and extending across the first nozzle section.

17. The powerplant of claim 1, wherein the exhaust section further includes an ejector configured to vent air in a compartment surrounding the core of the gas turbine engine into the exhaust flowpath.

18. The powerplant of claim 1, wherein the cross-sectional flow area of the second nozzle section continuously decreases in size as the second nozzle section extends longitudinally from the exhaust section to the second nozzle outlet.

19. The powerplant of claim 1, wherein a vertical height of the second nozzle section incrementally decreasing in size as the second nozzle section extends longitudinally towards the second nozzle outlet from the exhaust section.

* * * * *